United States Patent
Hayakawa et al.

(10) Patent No.: US 9,616,885 B2
(45) Date of Patent: Apr. 11, 2017

(54) VEHICULAR ACCELERATION SUPPRESSION DEVICE

(71) Applicant: NISSAN MOTOR CO., LTD., Yokohama-shi, Kanagawa (JP)

(72) Inventors: Yasuhisa Hayakawa, Yokohama (JP); Osamu Fukata, Sagamihara (JP); Akira Morimoto, Sagamihara (JP); Daisuke Oiki, Zama (JP); Daisuke Tanaka, Hadano (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/647,647

(22) PCT Filed: Nov. 22, 2013

(86) PCT No.: PCT/JP2013/006887
§ 371 (c)(1),
(2) Date: May 27, 2015

(87) PCT Pub. No.: WO2014/083827
PCT Pub. Date: Jun. 5, 2014

(65) Prior Publication Data
US 2016/0039409 A1    Feb. 11, 2016

(30) Foreign Application Priority Data
Nov. 27, 2012    (JP) .................................. 2012-259190

(51) Int. Cl.
*B60W 30/06* (2006.01)
*B60W 50/12* (2012.01)
(Continued)

(52) U.S. Cl.
CPC ............ *B60W 30/06* (2013.01); *B60W 50/12* (2013.01); *G06K 9/00812* (2013.01); *G06T 1/00* (2013.01);
(Continued)

(58) Field of Classification Search
None
See application file for complete search history.

(56) References Cited

U.S. PATENT DOCUMENTS

| | | | |
|---|---|---|---|
| 2008/0122654 A1* | 5/2008 | Sakakibara | ............ G08G 1/168 340/932.2 |
| 2008/0136673 A1* | 6/2008 | Jung | .................. B62D 15/0285 340/932.2 |

(Continued)

FOREIGN PATENT DOCUMENTS

| | | |
|---|---|---|
| JP | 2003137001 A | 5/2003 |
| JP | 2009205191 A | 9/2009 |

(Continued)

*Primary Examiner* — Truc M Do
*Assistant Examiner* — Jess Whittington
(74) *Attorney, Agent, or Firm* — Young Basile Hanlon & MacFarlane, P.C.

(57) ABSTRACT

A vehicular acceleration suppression device reduces the degradation in the drive performance due to the acceleration suppression control activated outside the parking region. A parking frame line candidate which is a candidate of a parking frame line is extracted from a bird's-eye view image acquired by performing a bird's-eye view conversion on a captured image around a vehicle, and a parking frame line candidate corresponding line corresponding the parking frame line candidate is extracted from the captured image of the front of the vehicle. Then, the parking frame line candidate corresponding to the parking frame line candidate corresponding line length of which is longer than a parking (Continued)

frame line length threshold is eliminated from the candidate to be detected as the parking frame.

8 Claims, 24 Drawing Sheets

(51) Int. Cl.
    *G06K 9/00*     (2006.01)
    *G06T 1/00*     (2006.01)
    *G08G 1/16*     (2006.01)

(52) U.S. Cl.
    CPC ... *B60W 2420/403* (2013.01); *B60W 2540/18* (2013.01); *B60W 2720/103* (2013.01); *B60W 2720/106* (2013.01); *G08G 1/168* (2013.01)

(56) References Cited

U.S. PATENT DOCUMENTS

| | | | | |
|---|---|---|---|---|
| 2009/0157286 A1* | 6/2009 | Saito | .................... | B60W 30/16 701/117 |
| 2009/0207045 A1* | 8/2009 | Jung | ..................... | G06T 7/0044 340/932.2 |
| 2011/0006917 A1 | 1/2011 | Taniguchi et al. | | |
| 2012/0169526 A1* | 7/2012 | Reilhac | ............. | B60W 50/0098 342/70 |
| 2013/0060421 A1* | 3/2013 | Kadowaki | ................. | B60R 1/00 701/36 |
| 2014/0039728 A1 | 2/2014 | Imazu et al. | | |
| 2014/0214260 A1* | 7/2014 | Eckert | ................... | B60Q 1/488 701/28 |
| 2014/0379197 A1* | 12/2014 | Eckert | ...................... | B60T 7/22 701/28 |

FOREIGN PATENT DOCUMENTS

| | | |
|---|---|---|
| JP | 2010215170 A | 9/2010 |
| JP | 2011016514 A | 1/2011 |
| JP | 2011030140 A | 2/2011 |
| JP | 2012001081 A | 1/2012 |
| JP | 2012080497 A | 4/2012 |
| JP | 2012228119 A | 11/2012 |

* cited by examiner

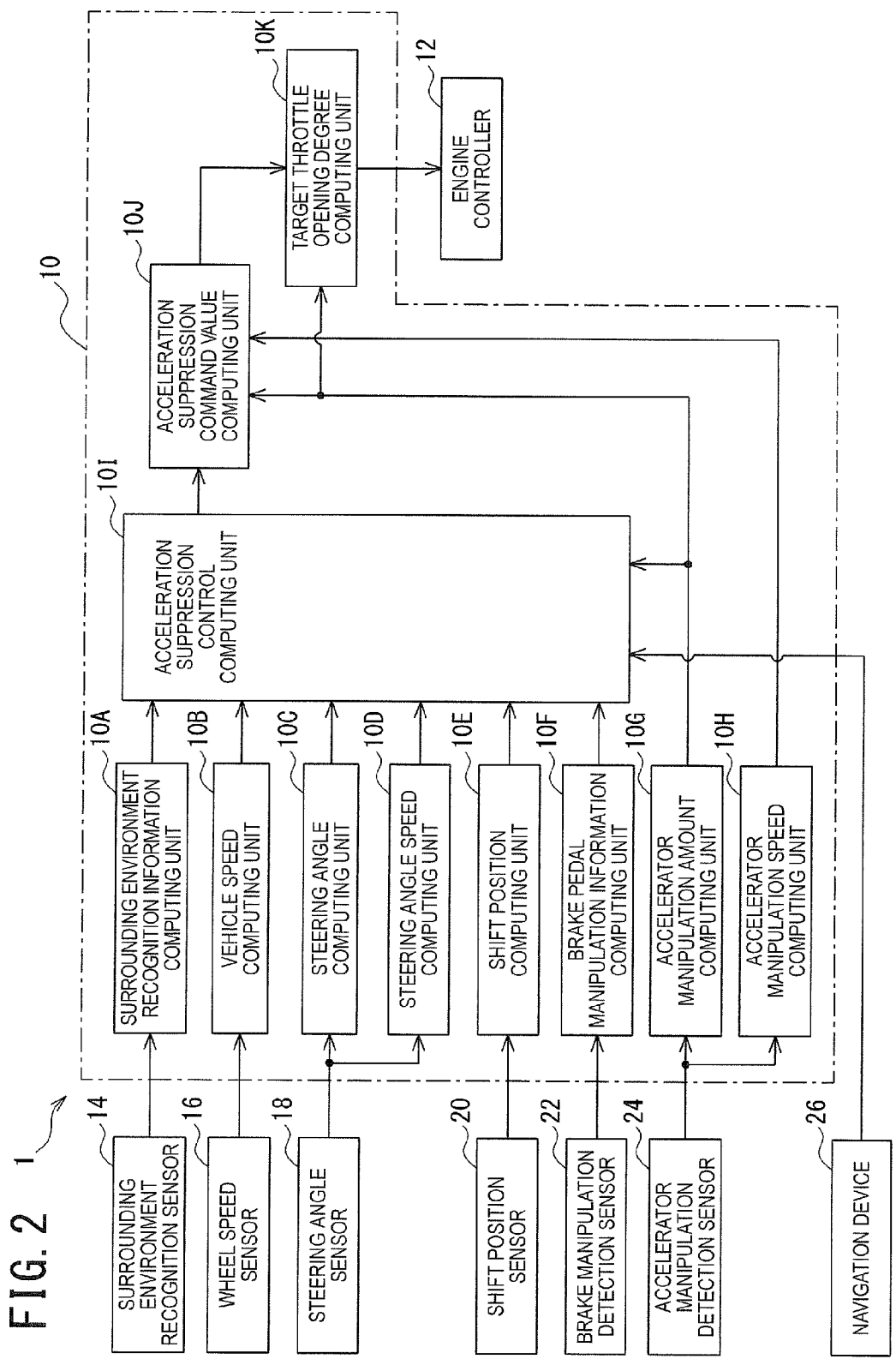

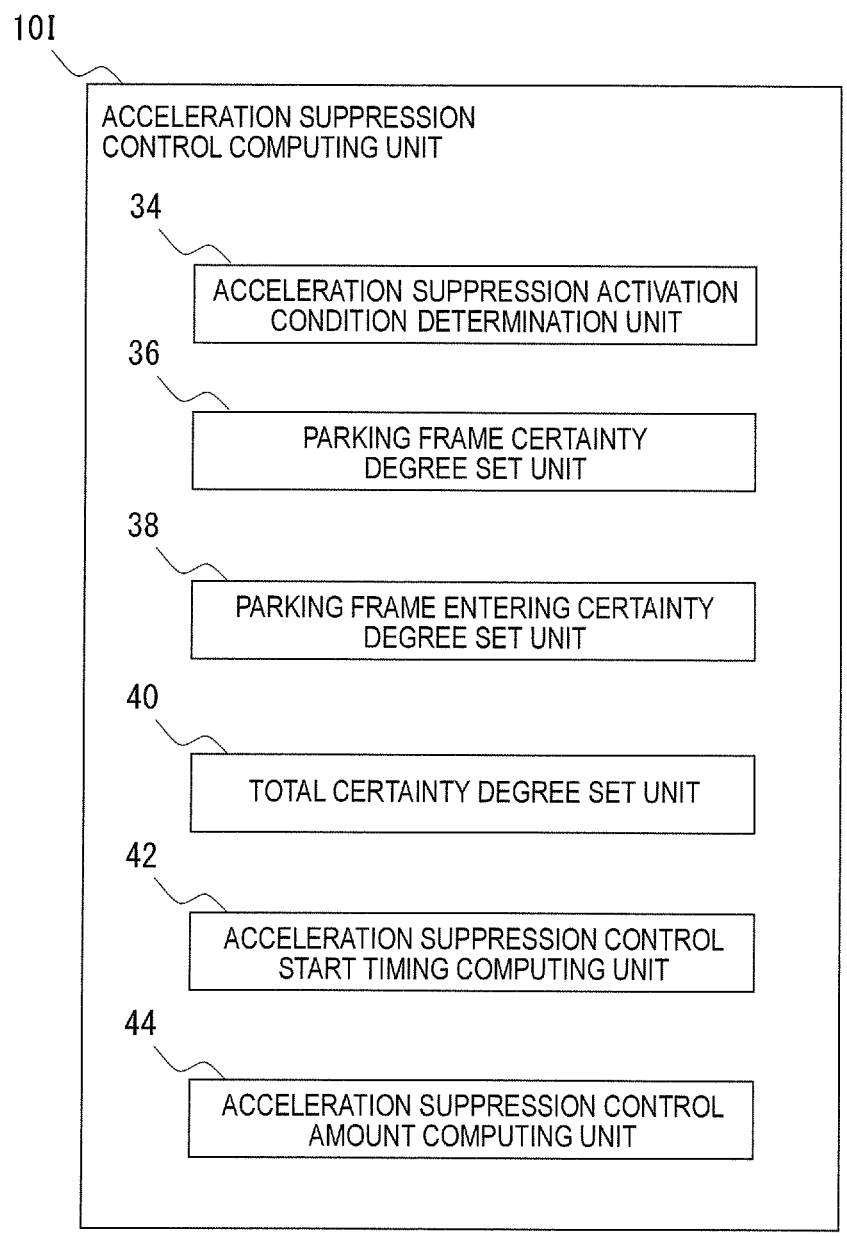

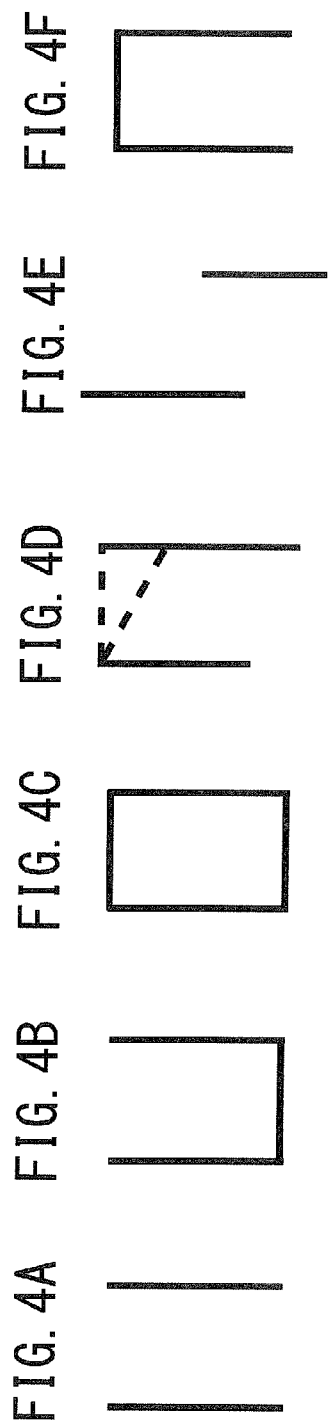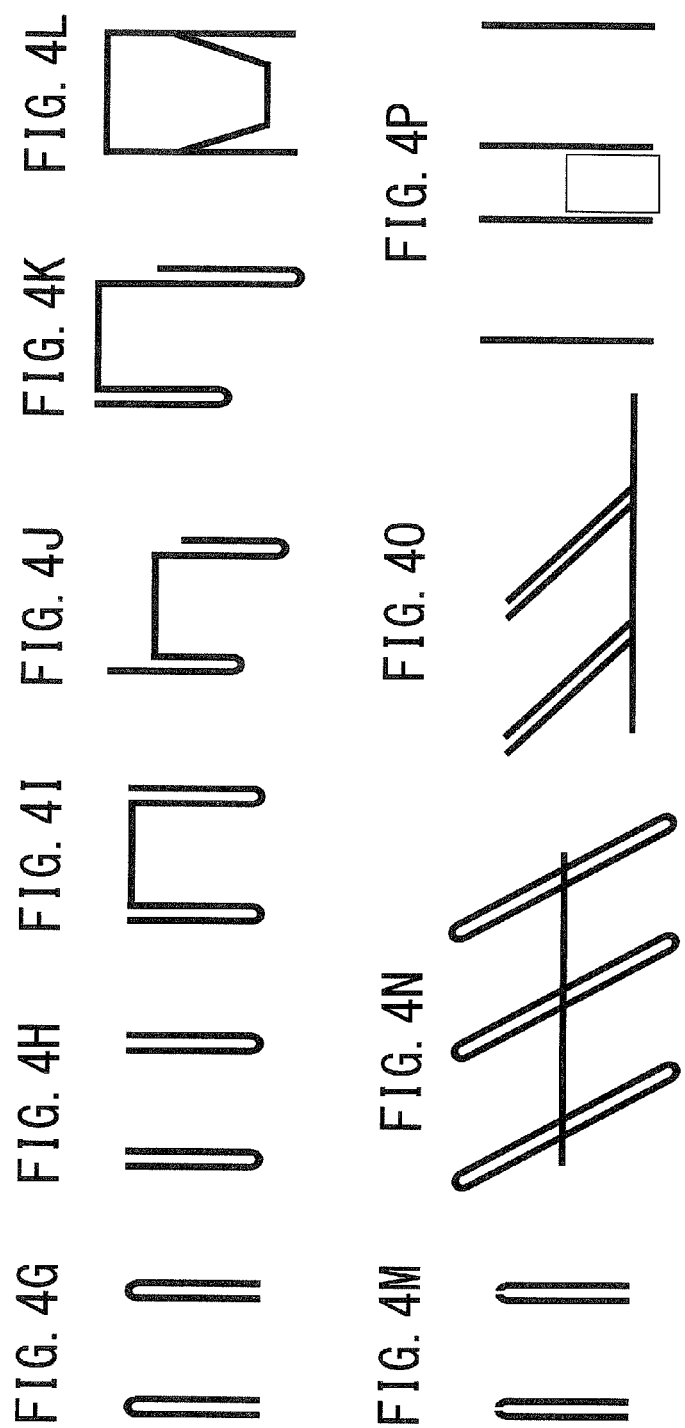

FIG. 20

| ENTERING CERTAINTY DEGREE \ FRAME CERTAINTY DEGREE | LEVEL 0 | LEVEL 1 | LEVEL 2 | LEVEL 3 | LEVEL 4 |
|---|---|---|---|---|---|
| LEVEL 0 | — | — | — | — | — |
| LOW LEVEL | — | EXTREMELY LOW | LOW | LOW | LOW |
| HIGH LEVEL | — | EXTREMELY LOW | LOW | HIGH | EXTREMELY HIGH |

FIG. 21

| ACCELERATION SUPPRESSION CONDITION \ TOTAL CERTAINTY DEGREE | EXTREMELY LOW | LOW | HIGH | EXTREMELY HIGH |
|---|---|---|---|---|
| SUPPRESSION CONTROL START TIMING (ACCELERATOR OPENING DEGREE) | 80% | 80% | 50% | 50% |
| SUPPRESSION AMOUNT | SMALL | MEDIUM | MEDIUM | LARGE |
| WARNING SOUND | NO | YES | YES | YES |

| ACCELERATION SUPPRESSION CONDITION / PARKING FRAME CERTAINTY DEGREE | LEVEL 1 | LEVEL 2 | LEVEL 3 | LEVEL 4 |
|---|---|---|---|---|
| SUPPRESSION CONTROL START TIMING (ACCELERATOR OPENING DEGREE) | 80% | 80% | 50% | 50% |
| SUPPRESSION AMOUNT | SMALL | MEDIUM | MEDIUM | LARGE |
| WARNING SOUND | NO | YES | YES | YES |

VEHICULAR ACCELERATION SUPPRESSION DEVICE

CROSS REFERENCE TO RELATED APPLICATION

This application claims priority from Japanese Patent Application No. 2012-259190 (filed on Nov. 27, 2012), which is incorporated herein by reference in its entirety.

TECHNICAL FIELD

This disclosure relates to a technology for suppressing acceleration of a vehicle in order to support driving at the time of parking.

BACKGROUND

As a technology for controlling a speed of a vehicle such as a car, for example, a safety device described in JP 2003-137001 A is known. The safety device detects that the vehicle is located at a position which departs from a road on the basis of map data of a navigation device and information indicative of the current position of the vehicle. When it is determined that an accelerator is manipulated so as to increase a driving speed of the vehicle and that the driving speed of the vehicle is higher than a predetermined value, the throttle is controlled so as to decrease the driving speed regardless of the manipulation of the accelerator.

JP 2003-137001 A intends to prevent the acceleration of the vehicle which the driver does not intend, even if the accelerator is erroneously manipulated.

In this situation, a technical problem is a determination of whether or not the manipulation of the accelerator is the erroneous manipulation. Then, in JP 2003-137001 A, it is determined that a pressing manipulation of the accelerator may be erroneous manipulation of the accelerator on the basis of the map information, when the vehicle is located at a position which departs from the road and the driving speed of the vehicle is detected as being higher than the predetermined value, and the above-mentioned condition is used as a condition to activate throttle suppression.

However, when the above-mentioned activation condition is used, the throttle suppression is activated when the vehicle only departs from the road to enter a parking space, and thus the drive performance in the parking space degrades.

SUMMARY

The present disclosure has been made in view of the above-mentioned problem, and has an object to improve the accuracy of drive support when parking the vehicle.

In order to solve the above-mentioned problem, according to an aspect of the present disclosure, a captured image of a region including a road surface around a vehicle is acquired and a bird's-eye view image is acquired by performing a bird's-eye view conversion on the captured image that has been acquired. Furthermore, a parking frame candidate located on the road surface is extracted from the bird's-eye view image. A parking frame is detected from the parking frame candidate, an acceleration suppression control which reduces an acceleration to be generated at the vehicle, which depends on an acceleration manipulation amount of an acceleration manipulation element manipulated by a driver to instruct the acceleration is performed, on the basis of the parking frame that has been extracted. On the other hand, a parking frame line candidate corresponding line corresponding to the parking frame line candidate that has been detected is extracted from the captured image of the front of the vehicle. Furthermore, when it is determined that a length of the parking frame line candidate corresponding line is equal to or longer than a predefined parking frame line length threshold, the parking frame line candidate corresponding to the parking frame line candidate corresponding line is eliminated from candidates to be detected as the parking frame.

BRIEF DESCRIPTION OF THE DRAWINGS

FIG. 2 is a block diagram illustrating a schematic configuration of a vehicular acceleration suppression device;

FIG. 3 is a block diagram illustrating a configuration of an acceleration suppression control computing unit;

FIGS. 4A to 4P are views illustrating patterns of parking frames for which a parking frame certainty degree set unit sets a parking frame certainty degree;

FIG. 20 is a view illustrating a total certainty degree set map;

FIG. 21 is a view illustrating an acceleration suppression condition computing map;

DETAILED DESCRIPTION OF THE EMBODIMENTS

Hereinafter, embodiments of the present disclosure will now be described with reference to the drawings.
(Configuration)

Figure 1:
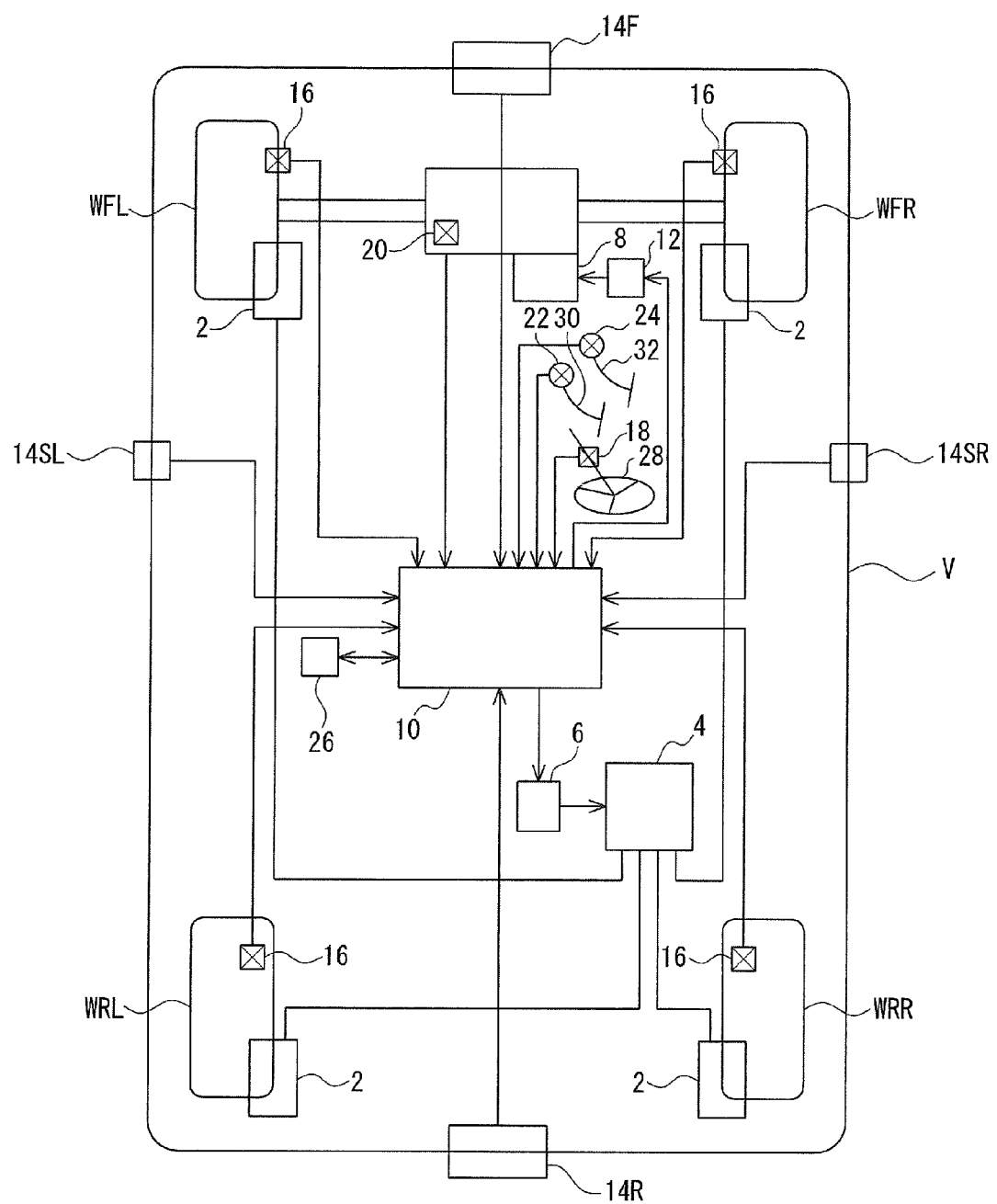
FIG. 1 is a conceptual diagram illustrating a configuration of a vehicle including a vehicular acceleration suppression device.

Firstly, a configuration of a vehicle including a vehicular acceleration suppression device according to the present embodiment will be described below, by using FIG. 1. FIG. 1 is a conceptual diagram illustrating the configuration of the vehicle V including the vehicular acceleration suppression device 1 according to the present embodiment.

As illustrated in FIG. 1, the vehicle V includes wheels W (a front right wheel WFR, a front left wheel WFL, a rear right wheel WRR, and a rear left wheel WRL), a brake device 2, a fluid pressure circuit 4, and a brake controller 6. In addition to this, the vehicle V includes an engine 8 and an engine controller 12.

The brake device 2 is configured with a wheel cylinder, for example, and is provided for each wheel W. It is to be noted that the brake device 2 is not limited to a device of applying a brake force by a fluid pressure, and may be configured with an electric brake device or the like.

The fluid pressure circuit 4 includes piping connected to the respective brake devices 2. The brake controller 6 is configured to control the brake force generated at the respective brake devices 2 to be a value corresponding to a brake force command value via the fluid pressure circuit 4, on the basis of the brake force command value received from a travel controller 10 which is a higher controller. That is, the brake controller 6 configures a deceleration control unit. It is to be noted that the travel controller 10 will be described later. Thus, the brake device 2, the fluid pressure circuit 4, and the brake controller 6 configure a brake device of generating a brake force.

The engine 8 configures a drive source of the vehicle V. The engine controller 12 is configured to control a torque (drive force) generated at the engine 8, on the basis of a target throttle opening degree signal (acceleration command value) received from the travel controller 10. That is, the engine controller 12 configures an acceleration control unit. It is to be noted that the target throttle opening degree signal will be described later. Thus, the engine 8 and the engine controller 12 configure a drive unit of generating the drive force.

It is to be noted that the drive source of the vehicle V is not limited to the engine 8, and may be configured with an electric motor. Furthermore, the drive source of the vehicle V may be configured by combining the engine 8 with the electric motor.

Next, a schematic configuration of the vehicular acceleration suppression device 1 will be described by using FIG. 2 and referring to FIG. 1. FIG. 2 is a block diagram illustrating the schematic configuration of the vehicular acceleration suppression device 1 according to the present embodiment.

As illustrated in FIG. 1 and FIG. 2, the vehicular acceleration suppression device 1 includes a surrounding environment recognition sensor 14, a wheel speed sensor 16, a steering angle sensor 18, a shift position sensor 20, a brake manipulation detection sensor 22, and an accelerator manipulation detection sensor 24. In addition to this, the vehicular acceleration suppression device 1 includes a navigation device 26 and a travel controller 10.

The surrounding environment recognition sensor 14 is configured to capture an image of surroundings of the vehicle V, and to generate an information signal (hereinafter, may be referred to as "individual image signal") including individual images corresponding to plural imaging directions on the basis of the respective images that has been captured. Then, the individual image signal that has been generated is output to the travel controller 10.

It is to be noted that, in the present embodiment, as an example, a description will be given of a case where the surrounding environment recognition sensor 14 is configured with a front camera 14F, a right side camera 14SR, a left side camera 14SL, and a rear camera 14R. Note that the front camera 14F is configured to capture a frontward image of the vehicle V in front-rear direction of the vehicle V, and the right side camera 14SR is configured to capture a right side image of the vehicle V. Furthermore, the left side camera 14SL is configured to capture a left side image of the vehicle V, and the rear camera 14R is configured to capture a rearward image of the vehicle V in the front-rear direction of the vehicle V.

Furthermore, in the present embodiment for example, the surrounding environment recognition sensor 14 is configured to capture images within distance ranges corresponding to maximum imaging ranges (for example, 100 m) of the respective cameras, which are set such that the fields of view thereof include a road surface around the vehicle V. The wheel speed sensor 16 is configured, for example, with a pulse generator, such that a rotary encoder of measuring a wheel speed pulse or the like.

Furthermore, the wheel speed sensor 16 is configured to detect a rotation speed of each wheel W, and to output an information signal (hereinafter, may be referred to as "wheel speed signal") including the rotation speed that has been detected to the travel controller 10. For example, the steering angle sensor 18 is provided at a steering column (not illustrated) configured to rotatably support a steering wheel 28.

Furthermore, the steering angle sensor 18 is configured to detect a current steering angle which is a current rotation angle (steering manipulation amount) of the steering wheel 28 which is a steering manipulation element. The steering angle sensor 18 is configured to output an information signal (hereinafter, may be referred to as "current steering angle signal") including the current steering angle that has been detected to the travel controller 10. It is to be noted that the information signal including the turning angle of turning wheels may be detected as information indicative of the steering angle.

Furthermore, the steering manipulation element is not limited to the steering wheel 28 steered by a driver. For example, it may be a lever manipulated to be inclined by a driver's hand. In this case, the inclination angle of the lever from a neutral position is output as the information signal corresponding to the current steering angle signal.

The shift position sensor 20 is configured to detect a current position of a member, such as a shift knob, a shift lever, or the like, configured to change the shift position (for example, "P", "D", "R" or the like) of the vehicle V. Then, the shift position sensor 20 is configured to output an information signal (hereinafter, may be referred to as "shift position signal") including the current position that has been detected to the travel controller 10.

The brake manipulation detection sensor 22 is configured to detect an opening degree of a brake pedal 30 which is a brake force instruction manipulation element. Then, the brake manipulation detection sensor 22 is configured to output an information signal (hereinafter, may be referred to as "brake opening degree signal") including the opening degree of the brake pedal 30 which has been detected to the travel controller 10.

Note that the brake force instruction manipulation element can be manipulated by the driver of the vehicle V, and is configured to instruct the brake force of the vehicle V by a change in the opening degree. It is to be noted that the brake force instruction manipulation element is not limited to the brake pedal 30 to be pressed for manipulation by the driver with a foot. For example, it may be a lever manipulated by the driver's hand.

The accelerator manipulation detection sensor 24 is configured to detect the opening degree of an accelerator pedal 32 that is a drive force instruction manipulation element. Then, the accelerator manipulation detection sensor 24 is configured to output an information signal (hereinafter, may be referred to as "accelerator opening degree signal") including the opening degree of the accelerator pedal 32 that has been detected to the travel controller 10.

Note that the drive force instruction manipulation element can be manipulated by the driver of the vehicle V, and is configured to indicate the drive force of the vehicle V by a change in the opening degree. It is to be noted that the drive force instruction manipulation element is not limited to the accelerator pedal 32 to be pressed for manipulation by the driver with the foot. For example, it may be a lever manipulated by the driver's hand.

The navigation device 26 includes a GPS (Global Positioning System) receiver, a map database, an information presentation device including a display monitor, and the like, and is configured to perform a route search, a route guidance, and the like.

Furthermore, the navigation device 26 is capable of acquiring road information such as a type, a width, and the like of the road on which the vehicle V travels, on the basis of the current position of the vehicle V acquired by using the GPS receiver and the road information stored in the map database.

Furthermore, the navigation device 26 is configured to output an information signal (hereinafter, may be referred to as "vehicle position signal") including the current position of the vehicle V acquired by using the GPS receiver to the travel controller 10. In addition to this, the navigation device 26 is configured to output an information signal (hereinafter, may be referred to as "travel road information signal") including the type, the width, and the like of the road on which the vehicle V travels to the travel controller 10.

The information presentation device is configured to output warning or another presentation in a sound or image in response to a control signal from the travel controller 10. Furthermore, the information presentation device includes for example, a speaker configured to provide information to the driver in a buzzer or a sound, and a display unit configured to provide information by presenting an image or text. Furthermore, for example, a display monitor of the navigation device 26 may be also used as the display unit.

The travel controller 10 is an electronic control unit including a CPU (Central Processing Unit) and CPU peripheral components such as a ROM (Read Only Memory), a RAM (Random Access Memory), and the like.

Furthermore, the travel controller 10 includes a parking drive support unit configured to perform a drive support processing for parking the vehicle.

The parking drive support unit of processing of the travel controller 10 functionally includes, as illustrated in FIG. 2, processing of a surrounding environment recognition information computing unit 10A, a vehicle speed computing unit 10B, a steering angle computing unit 10C, and a steering angle speed computing unit 10D. In addition to this, the parking drive support unit functionally includes processing of a shift position computing unit 10E, a brake pedal manipulation information computing unit 10F, an accelerator manipulation amount computing unit 10G, an accelerator manipulation speed computing unit 10H, and an acceleration suppression control computing unit 10I. Furthermore, the parking drive support unit functionally includes processing of an acceleration suppression command value computing unit 10J, and a target throttle opening degree computing unit 10K. These functions are configured with one or more programs.

The surrounding environment recognition information computing unit 10A is configured to create an image (bird's-eye view image) of surroundings of the vehicle V viewed from above to below the vehicle V on the basis of the individual image signal received from the surrounding environment recognition sensor 14. Then, the surrounding environment recognition information computing unit 10A is configured to output an information signal (hereinafter, may be referred to as "bird's-eye view image signal") including the bird's-eye view image that has been created, and the individual image signals corresponding to the bird's-eye view image signal to the acceleration suppression control computing unit 10I.

Note that the bird's-eye view image is created, for example, by synthesizing the images captured by the respective cameras (the front camera 14F, the right side camera 14SR, the left side camera 14SL, and the rear camera 14R). Furthermore, a bird's-eye view image includes, for example, an image indicative of a road marking such as a line of a parking frame (hereinafter, may be referred to as "parking frame line") displayed on a road surface.

The vehicle speed computing unit 10B is configured to compute the speed (vehicle speed) of the vehicle V from the rotation speed of the wheel W on the basis of the wheel speed signal received from the wheel speed sensor 16. Then, the vehicle speed computing unit 10B is configured to output an information signal (hereinafter, may be referred to as "vehicle speed computed value signal") including the speed that has been computed to the acceleration suppression control computing unit 10I.

The steering angle computing unit 10C is configured to compute the manipulation amount (rotation angle) of the steering wheel 28 from the neutral position on the basis of the current steering angle signal received from the steering angle sensor 18 from the current rotation angle of the steering wheel 28. Then, the steering angle computing unit 10C is configured to output an information signal (hereinafter, may be referred to as "steering angle signal") including the manipulation amount from the neutral position that has been computed to the acceleration suppression control computing unit 10I.

The steering angle speed computing unit 10D is configured to perform differential processing on the current steering angle included in the steering angle signal received from the steering angle sensor 18, and to compute the steering angle speed of the steering wheel 28. Then, the steering angle speed computing unit 10D is configured to output an information signal (hereinafter, may be referred to as "steering angle speed signal") including the steering angle speed that has been computed to the acceleration suppression control computing unit 10I.

The shift position computing unit 10E is configured to determine the current shift position on the basis of the shift position signal received from the shift position sensor 20. Then, the shift position computing unit 10E is configured to output an information signal (hereinafter, may be referred to as "current shift position signal") including the current shift position that has been computed to the acceleration suppression control computing unit 10I.

The brake pedal manipulation information computing unit 10F is configured to compute the pressed amount of the brake pedal 30 with a reference state in which the pressed amount is "0", on the basis of the brake opening degree signal that has been received from the brake manipulation detection sensor 22. Then, the brake pedal manipulation information computing unit 10F is configured to output an information signal (hereinafter, may be referred to as "brake side pressed amount signal") including the pressed amount of the brake pedal 30 that has been computed to the acceleration suppression control computing unit 10I.

The accelerator manipulation amount computing unit 10G is configured to compute the pressed amount of the accelerator pedal 32 with a reference state in which the pressed amount is "0", on the basis of the accelerator opening degree signal that has been received from the accelerator manipulation detection sensor 24. Then, the accelerator manipulation amount computing unit 10G is configured to output an information signal (hereinafter, may be referred to as "drive side pressed amount signal") including the pressed amount of the accelerator pedal 32 that has been computed to the acceleration suppression control computing unit 10I, the acceleration suppression command value computing unit 10J, and the target throttle opening degree computing unit 10K.

The accelerator manipulation speed computing unit 10H is configured to compute the manipulation speed of the accelerator pedal 32, by performing differential processing on the opening degree of the accelerator pedal 32 included in the accelerator opening degree signal that has been received from the accelerator manipulation detection sensor 24. Then, the accelerator manipulation speed computing unit 10H is configured to output an information signal (hereinafter, may be referred to as "accelerator manipulation speed signal") including the manipulation speed of the accelerator pedal 32 that has been computed to the acceleration suppression command value computing unit 10J.

The acceleration suppression control computing unit 10I is configured to receive inputs of the above-mentioned various information signals (including the bird's-eye view image signal, the individual image signal, the vehicle speed computed value signal, the steering angle signal, the steering angle speed signal, the current shift position signal, the brake side pressed amount signal, the drive side pressed amount signal, the vehicle position signal, and the travel road information signal). Then, the acceleration suppression control computing unit 10I is configured to compute an acceleration suppression activation condition determination result, an acceleration suppression control start timing, and an acceleration suppression control amount, to be described later, on the basis of the various information signals that have been received. Furthermore, the acceleration suppression control computing unit 10I is configured to output information signals including these parameters that have been computed to the acceleration suppression command value computing unit 10J.

It is to be noted that a detailed configuration of the acceleration suppression control computing unit 10I and processing performed by the acceleration suppression control computing unit 10I will be described later.

The acceleration suppression command value computing unit 10J is configured to receive inputs of the drive side pressed amount signal and the accelerator manipulation speed signal described above, and inputs of an acceleration suppression activation condition determination result signal, an acceleration suppression control start timing signal, and an acceleration suppression control amount signal, to be described later. Then, the acceleration suppression command value computing unit 10J is configured to compute the acceleration suppression command value which is a command value for reducing the acceleration to be generated at the vehicle V which depends on the pressed amount (acceleration manipulation amount) of the accelerator pedal 32.

Furthermore, the acceleration suppression command value computing unit 10J is configured to output an information signal (hereinafter, may be referred to as "acceleration suppression command value signal") including the acceleration suppression command value that has been computed to the target throttle opening degree computing unit 10K.

Furthermore, the acceleration suppression command value computing unit 10J is configured to compute a normal acceleration command value which is a command value for use in normal acceleration control depending on the acceleration suppression activation condition determination result signal that has been received. Furthermore, the acceleration suppression command value computing unit 10J is configured to output an information signal (hereinafter, may be referred to as "normal acceleration command value signal") including the normal acceleration command value that has been computed to the target throttle opening degree computing unit 10K. It is to be noted that the processing performed by the acceleration suppression command value computing unit 10J will be described later.

The target throttle opening degree computing unit 10K is configured to receive inputs of the drive side pressed amount signal, and the acceleration suppression command value signal or the normal acceleration command value signal.

Then, the target throttle opening degree computing unit 10K is configured to compute the target throttle opening degree which is the throttle opening degree depending on the pressed amount of the accelerator pedal 32 or the acceleration suppression command value, on the basis of the pressed amount of the accelerator pedal 32, and the acceleration suppression command value or the normal acceleration command value. Furthermore, the target throttle opening degree computing unit 10K is configured to output an information signal (hereinafter, maybe referred to as "target throttle opening degree signal") including the target throttle opening degree that has been computed to the engine controller 12.

Furthermore, the target throttle opening degree computing unit 10K is configured to output the target throttle opening degree signal to the engine controller 12 on the basis of the acceleration suppression control start timing, to be described later, when the acceleration suppression command value includes the acceleration suppression control start timing command value to be described later. It is to be noted that the processing performed by the target throttle opening degree computing unit 10K will be described later.

(Configuration of Acceleration Suppression Control Computing Unit 10I)

Next, a detailed configuration of the acceleration suppression control computing unit 10I will be described, by using FIG. 3 and FIGS. 4A to 4P, and referring to FIG. 1 and FIG. 2. FIG. 3 is a block diagram illustrating the configuration of the acceleration suppression control computing unit 10I.

As illustrated in FIG. 3, the acceleration suppression control computing unit 10I includes an acceleration suppression activation condition determination unit 34, a parking frame certainty degree set unit 36, a parking frame entering certainty degree set unit 38, and a total certainty degree set unit 40. In addition to this, the acceleration suppression control computing unit 10I includes an acceleration suppression control start timing computing unit 42, and an acceleration suppression control amount computing unit 44.

The acceleration suppression activation condition determination unit 34 is configured to determine whether or not a condition to activate acceleration suppression control is satisfied, and to output an information signal (hereinafter, may be referred to as "acceleration suppression activation condition determination result signal") including the determination result to the acceleration suppression command value computing unit 10J. Note that the acceleration suppression control means control to set an acceleration command value to accelerate the vehicle V depending on the pressed amount of the accelerator pedal 32, to a value reducing an acceleration than normal. In the present embodiment, the larger acceleration command value, the larger acceleration. Thus, the acceleration suppression control is a control to reduce the acceleration command value to accelerate the vehicle V, which depends on the pressed amount of the accelerator pedal 32.

Furthermore, a description will be given later of the processing by the acceleration suppression activation condition determination unit 34 of determining whether or not the condition to activate acceleration suppression control is satisfied.

The parking frame certainty degree set unit 36 is configured to set a parking frame certainty degree indicative of a degree of certainty about a presence of a parking frame in a travel direction of the vehicle V. Then, the parking frame certainty degree set unit 36 is configured to output an information signal (hereinafter, may be referred to as "parking frame certainty degree signal") including the parking frame certainty degree that has been set to the total certainty degree set unit 40.

Note that the parking frame certainty degree set unit 36 is configured to calculate the parking frame certainty degree by referring to various information included in the bird's-eye view image signal, the individual image signal, the vehicle speed computed value signal, the current shift position signal, the vehicle position signal, and the travel road information signal.

Furthermore, there are plural patterns of the parking frames for which the parking frame certainty degree set unit 36 sets the certainty degree, as illustrated in FIGS. 4A to 4P for example. It is to be noted that FIGS. 4A to 4P are views illustrating the patterns of the parking frames for which the parking frame certainty degree set unit 36 sets the parking frame certainty degree.

Furthermore, the parking frame certainty degree set unit 36 is configured to detect a line on the road surface estimated to form the parking frame as a candidate of the parking frame line, from a bird's-eye view image of the front of the vehicle V in front-rear direction (hereinafter, may be referred to as "bird's-eye view image BVF"). Furthermore, the parking frame certainty degree set unit 36 is configured to extract a parking frame line candidate corresponding line which is a line corresponding to the candidate of the parking frame line that has been detected (hereinafter, may be referred to as "parking frame line candidate"), from the individual image corresponding to the bird's-eye view image BVF (hereinafter, may be referred to as "individual image SPF"). Furthermore, the parking frame certainty degree set unit 36 is configured to determine whether or not the length of the parking frame line candidate corresponding line that has been extracted is equal to or longer than a predefined parking frame line length threshold Th1. Then, the parking frame certainty degree set unit 36 is configured to perform a frame line candidate elimination processing to eliminate the parking frame line candidate that has been detected, from candidates to be detected as parking frame, on the basis of the determination result.

It is to be noted that the details of the processing of setting the parking frame certainty degree and the details of the frame line candidate elimination processing by the parking frame certainty degree set unit 36 will be described later.

The parking frame entering certainty degree set unit 38 is configure to set a parking frame entering certainty degree indicative of the degree of certainty about whether the vehicle V enters a parking frame. Then, the parking frame entering certainty degree set unit 38 is configured to output an information signal (hereinafter, may be referred to as "parking frame entering certainty degree signal") including the parking frame entering certainty degree that has been set to the total certainty degree set unit 40.

Note that the parking frame entering certainty degree set unit 38 is configured to set the parking frame entering certainty degree by referring to various information included in the bird's-eye view image signal, the vehicle speed computed value signal, the current shift position signal, and the steering angle signal. It is to be noted that the processing of setting the parking frame entering certainty degree by the parking frame entering certainty degree set unit 38 will be described later.

The total certainty degree set unit 40 is configured to receive inputs of the parking frame certainty degree signal the parking frame entering certainty degree signal, and to set the total certainty degree which is total certainty corresponding to the parking frame certainty degree and the parking frame entering certainty degree. Then, the total certainty degree set unit 40 is configured to output an information signal (hereinafter, may be referred to as "total certainty degree signal") including the total certainty degree that has been set to the acceleration suppression control start timing computing unit 42 and the acceleration suppression control amount computing unit 44. It is to be noted that the processing of setting the total certainty degree by the total certainty degree set unit 40 will be described later.

The acceleration suppression control start timing computing unit 42 is configured to compute the acceleration suppression control start timing which is a timing to start acceleration suppression control. Then, the acceleration suppression control start timing computing unit 42 is configured to output an information signal (hereinafter, may be referred to as "acceleration suppression control start timing signal") including the acceleration suppression control start timing that has been computed to the acceleration suppression command value computing unit 10J.

Note that the acceleration suppression control start timing computing unit 42 is configured to compute the acceleration suppression control start timing by referring to various information included in the total certainty degree signal, the brake side pressed amount signal, the vehicle speed computed value signal, the current shift position signal, and the steering angle signal. It is to be noted that the processing of computing the acceleration suppression control start timing by the acceleration suppression control start timing computing unit 42 will be described later.

The acceleration suppression control amount computing unit 44 is configured to compute an acceleration suppression control amount which is a control amount to suppress the acceleration command value which depends on the pressed amount of the accelerator pedal 32. Then, the acceleration suppression control amount computing unit 44 is configured to output an information signal (hereinafter, may be referred to as "acceleration suppression control amount signal") including the acceleration suppression control amount that has been computed to the acceleration suppression command value computing unit 10J.

Note that the acceleration suppression control amount computing unit 44 is configured to compute the acceleration suppression control amount by referring to various information included in the total certainty degree signal, the brake side pressed amount signal, the vehicle speed computed value signal, the current shift position signal, and the steering angle signal. It is to be noted that the processing of computing the acceleration suppression control amount by the acceleration suppression control amount computing unit 44 will be described later.

(Processing Performed by Acceleration Suppression Control Computing Unit 10I)

Next, the processing performed by the acceleration suppression control computing unit 10I will be described, by using FIG. 5 to FIG. 13, and referring to FIG. 1 to FIG. 4P.

The processing by the acceleration suppression activation condition determination unit 34 of determining whether or not the condition (hereinafter, may be referred to as "acceleration suppression activation condition") to activate the acceleration suppression control is satisfied will be described, by using FIG. 5 and FIG. 6, and referring to FIG. 1 to FIG. 4P.

Figure 5:
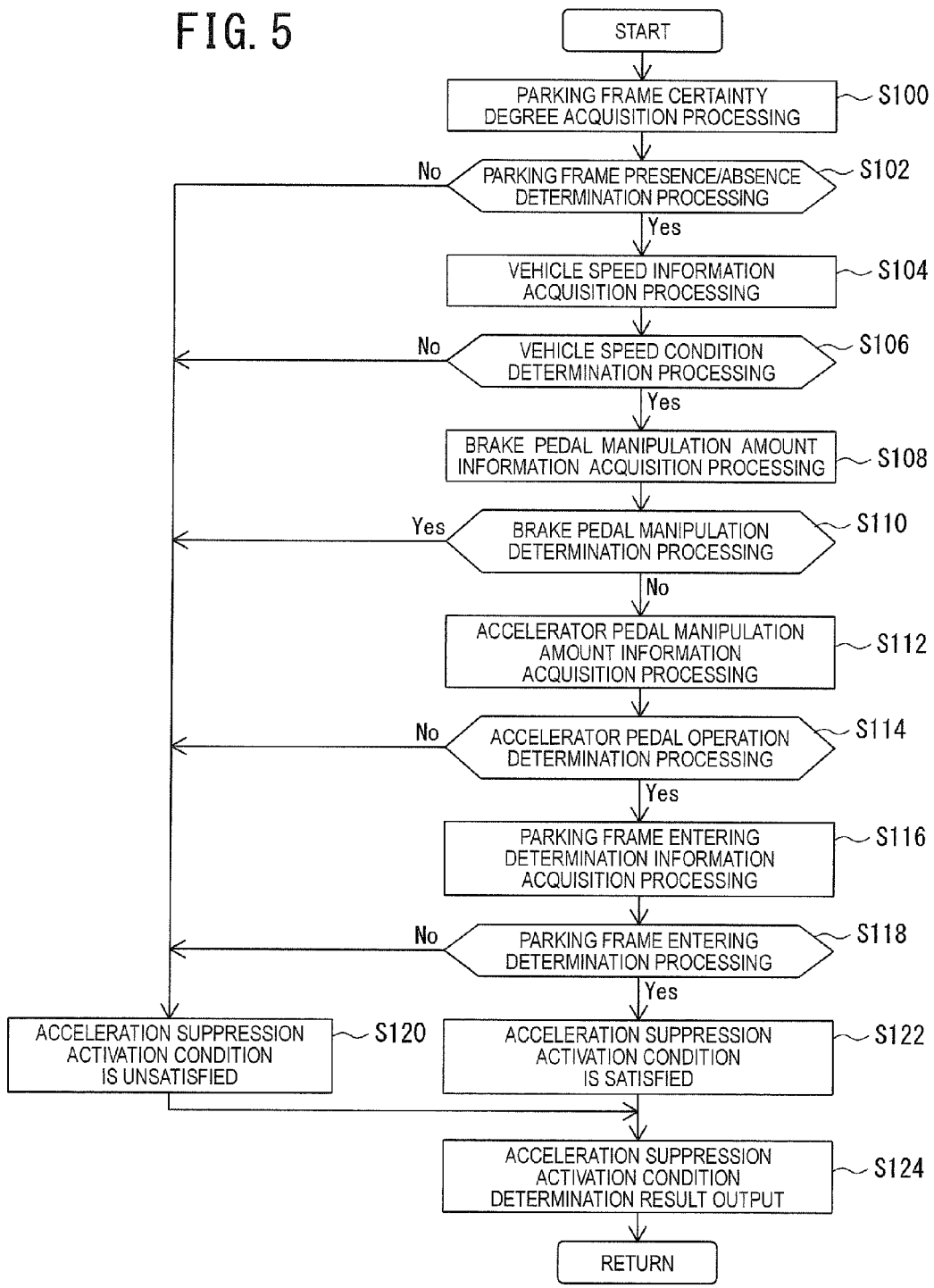
FIG. 5 is a flowchart illustrating processing by an acceleration suppression activation condition determination unit of determining whether or not an acceleration suppression activation condition is satisfied.

FIG. 5 is a flowchart illustrating the processing by the acceleration suppression activation condition determination unit 34 of determining whether or not the acceleration suppression activation condition is satisfied. It is to be noted that the acceleration suppression activation condition determination unit 34 is configured to perform the processing to be described below at every predefined sampling time (for example, 10 msec).

As illustrated in FIG. 5, when the acceleration suppression activation condition determination unit 34 starts the processing (START), firstly, in step S100, processing of acquiring a parking frame certainty degree set by the parking frame certainty degree set unit 36 ("parking frame certainty degree acquisition processing" in the drawing) is performed. When the processing of acquiring a parking frame certainty degree is performed in step S100, the processing performed by the acceleration suppression activation condition determination unit 34 proceeds to step S102.

In step S102, on the basis of the parking frame certainty degree acquired in step S100, processing of determining the presence or absence of the parking frame ("parking frame presence/absence determination processing" in the drawing) is performed.

In the present embodiment, the processing of determining the presence or absence of the parking frame is performed on the basis of the parking frame certainty degree.

Specifically, when it is determined that the parking frame certainty degree is a predefined minimum (level 0), it is determined the parking frame is not present ("No" in the drawing), for example, at a distance or in an area predefined based on the vehicle V. In this case, the processing performed by the acceleration suppression activation condition determination unit 34 proceeds to step S120.

On the other hand, when it is determined that the parking frame certainty degree is a value other than the predefined minimum, it is determined the parking frame is present ("Yes" in the drawing) at the distance or in the area predefined based on the vehicle V. In this case, the processing performed by the acceleration suppression activation condition determination unit 34 proceeds to step S104.

In step S104, by referring to the vehicle speed computed value signal received from the vehicle speed computing unit 10B, the processing of acquiring the vehicle speed of the vehicle V ("vehicle speed information acquisition processing" in the drawing) is performed. When the processing of acquiring the vehicle speed of the vehicle V is performed in step S104, the processing performed by the acceleration suppression activation condition determination unit 34 proceeds to step S106.

In step S106, on the basis of the vehicle speed acquired in step S104, processing of determining whether or not the condition that the speed of the vehicle V is lower than a predefined threshold vehicle speed is satisfied ("vehicle speed condition determination processing" in the drawing) is performed.

It is to be noted that in the present embodiment, a case where the threshold vehicle speed is set to 15 km/h, as an example, will be described. Furthermore, the threshold vehicle speed is not limited to 15 km/h. For example, it may be changed depending on data of the vehicle V, such as a brake performance of the vehicle V or the like. Furthermore, for example, it may be changed depending on the local (national) traffic regulation where the vehicle V travels.

When it is determined that the condition that the vehicle speed of the vehicle V is lower than the threshold vehicle speed is satisfied ("Yes" in the drawing) in step S106, the processing performed by the acceleration suppression activation condition determination unit 34 proceeds to step S108.

On the other hand, it is determined that the condition that the vehicle speed of the vehicle V is lower than the threshold vehicle speed is not satisfied ("No" in the drawing) in step S106, the processing performed by the acceleration suppression activation condition determination unit 34 proceeds to step S120.

In step S108, by referring to the brake side pressed amount signal received from the brake pedal manipulation information computing unit 10F, processing of acquiring information about the pressed amount (brake force manipulation amount) of the brake pedal 30 ("brake pedal manipulation amount information acquisition processing" in the drawing) is performed. When the processing of acquiring the information about the pressed amount (brake force manipulation amount) of the brake pedal 30 is performed in step S108, the processing performed by the acceleration suppression activation condition determination unit 34 proceeds to step S110.

In step S110, on the basis of the pressed amount of the brake pedal 30 acquired in step S108, processing of determining whether or not the brake pedal 30 is manipulated ("brake pedal manipulation determination processing" in the drawing) is performed. When it is determined that the brake pedal 30 is not manipulated ("No" in the drawing) in step S110, the processing performed by the acceleration suppression activation condition determination unit 34 proceeds to step S112.

On the other hand, when it is determined that the brake pedal 30 is manipulated ("Yes" in the drawing) in step S110, the processing performed by the acceleration suppression activation condition determination unit 34 proceeds to step S120.

In step S112, by referring to the drive side pressed amount signal received from the accelerator manipulation amount computing unit 10G, processing of acquiring the information about the pressed amount (acceleration manipulation amount) of the accelerator pedal 32 ("accelerator pedal manipulation amount information acquisition processing" in the drawing) is performed. When the processing of acquiring the information about the pressed amount (acceleration manipulation amount) of the accelerator pedal 32 is performed in step S112, the processing performed by the acceleration suppression activation condition determination unit 34 proceeds to step S114.

In step S114, processing of determining whether or not the condition that the pressed amount (acceleration manipulation amount) of the accelerator pedal 32 is equal to or larger than a predefined threshold accelerator manipulation amount is satisfied ("accelerator pedal operation determination processing" in the drawing) is performed. Note that the processing in step S114 is performed on the basis of the pressed amount of the accelerator pedal 32 acquired in step S112.

It is to be noted that in the present embodiment, a case where the threshold accelerator manipulation amount is set to a manipulation amount corresponding to 3% of the opening degree of the accelerator pedal 32, as an example, will be described. Furthermore, the threshold accelerator manipulation amount is not limited to the manipulation amount corresponding to 3% of the opening degree of the accelerator pedal 32. For example, it may be changed depending on data of the vehicle V, such as the brake performance of the vehicle V or the like.

When it is determined that the condition that the pressed amount (acceleration manipulation amount) of the accelerator pedal 32 is equal to or larger than the threshold accelerator manipulation amount is satisfied ("Yes" in the drawing) in step S114, the processing performed by the acceleration suppression activation condition determination unit 34 proceeds to step S116.

On the other hand, when it is determined that the condition that the pressed amount (acceleration manipulation amount) of the accelerator pedal 32 is equal to or larger than the threshold accelerator manipulation amount is not satisfied ("No" in the drawing) in step S114, the processing performed by the acceleration suppression activation condition determination unit 34 proceeds to step S120.

In step S116, processing of acquiring information to determine whether or not the vehicle V enters a parking frame ("parking frame entering determination information acquisition processing" in the drawing) is performed. Note that, in the present embodiment, as an example, a description will be given for a case where it is determined whether or not the vehicle V enters the parking frame, on the basis of the steering angle of the steering wheel 28, an angle between the vehicle V and the parking frame, and a distance between the vehicle V and the parking frame. When the processing of acquiring the information to determine whether or not the vehicle V enters a parking frame is performed in step S116, the processing performed by the acceleration suppression activation condition determination unit 34 proceeds to step S118.

Now, a specific example of the processing performed in step S116 will be described. In step S116, by referring to the steering angle signal received from the steering angle computing unit 10C, the rotation angle (steering angle) of the steering wheel 28 is acquired. In addition to this, on the basis of the bird's-eye view image of surroundings of the vehicle V included in the bird's-eye view image signal received from the surrounding environment recognition information computing unit 10A, an angle $\alpha$ between the vehicle V and a parking frame L0 and a distance D between the vehicle V and the parking frame L0 are acquired.

Figure 6:
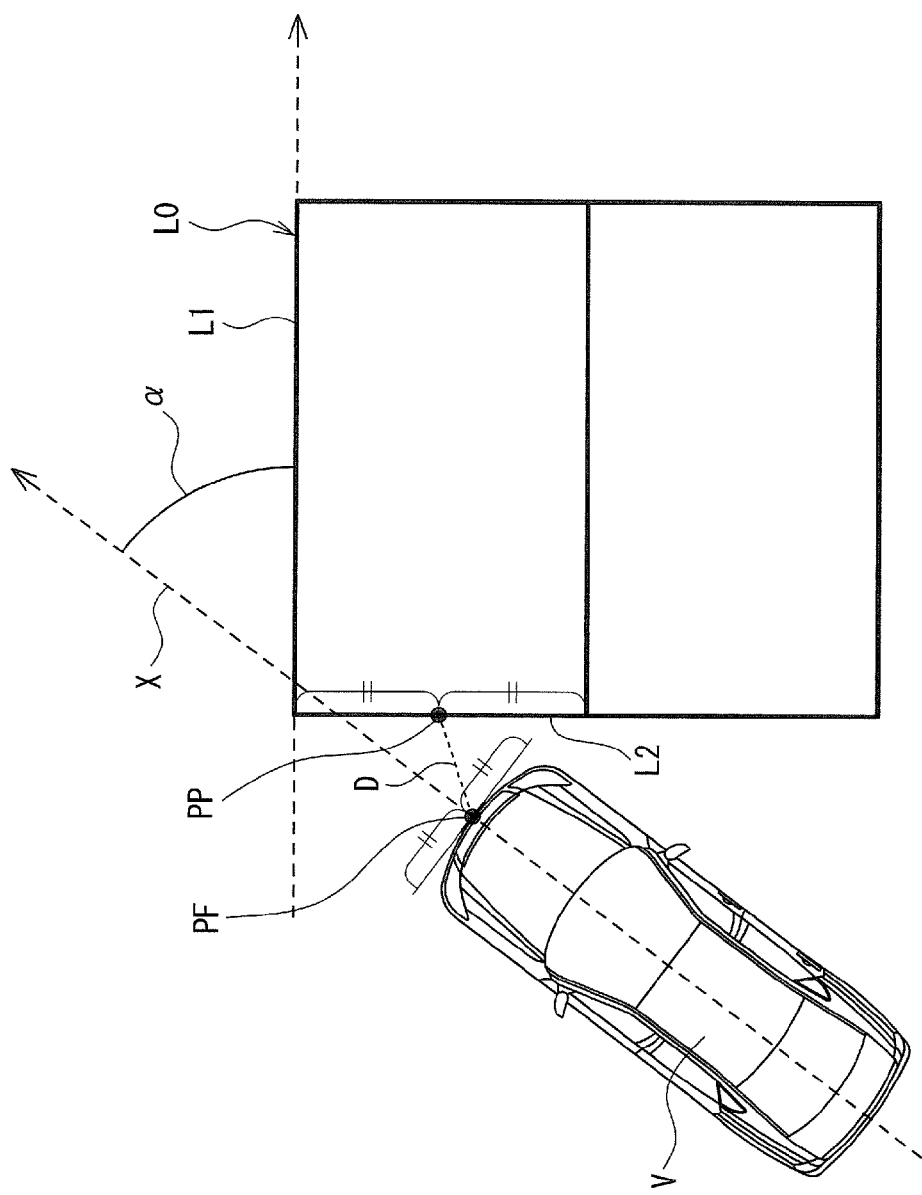
FIG. 6 is a view illustrating a vehicle, a parking frame, and a distance between the vehicle and the parking frame.

Note that the angle $\alpha$ is, for example, set to an absolute value of a crossing angle of a virtual straight line X and a frame line L1 as well as a line on the parking frame L0 side, as illustrated in FIG. 6. It is to be noted that FIG. 6 is a view illustrating the vehicle V, the parking frame L0, and the distance D between the vehicle V and the parking frame L0.

Furthermore, the straight line X is a straight line extending in the front-rear direction of the vehicle V passing through the center of the vehicle V (a virtual straight line extending in the travel direction). The frame line L1 is a frame line of the parking frame L0, which is parallel or substantially parallel to the front-rear direction of the vehicle V when parking in the parking frame L0 is completed. Furthermore, the line on the parking frame L0 side is an extending line of the parking line L1 existing on the parking frame L0 side.

Furthermore, the distance D is, for example, as illustrated in FIG. 6, set to a distance between a center point PF of the front end face of the vehicle V and a center point PP of an entrance L2 of the parking frame L0. The distance D, however, takes a negative value after the front end face of the vehicle V passes through the entrance L2 of the parking frame L0. It is to be noted that the distance D may be set to zero, after the front end face of the vehicle V passes through the entrance L2 of the parking frame L0.

Note that the position on the vehicle V side for defining the distance D is not limited to the center point PF. For example, they may be a predefined position on the vehicle V and a predefined position at the entrance L2. In this case, the distance D is set to be a distance between the predefined position on the vehicle V and the predefined position at the entrance L2.

As described heretofore, in step S116, as the information to determine whether or not the vehicle V enters the parking frame L0, the steering angle, the angle α of the vehicle V and the parking frame L0, and the distance D between the vehicle V and the parking frame L0 are acquired.

In step S118, on the basis of the information acquired in step S116, processing of determining whether or not the vehicle V enters the parking frame ("parking frame entering determination processing" in the drawing) is performed.

When it is determined that the vehicle V does not enter the parking frame ("No" in the drawing) in step S118, the processing performed by the acceleration suppression activation condition determination unit 34 proceeds to step S120.

On the other hand, when it is determined that the vehicle V enters the parking frame ("Yes" in the drawing) in step S118, the processing performed by the acceleration suppression activation condition determination unit 34 proceeds to step S122.

Now, a specific example of the processing performed in step S118 will be described. In step S118, when all of following three conditions (A1 to A3) are satisfied, for example, it is determined that the vehicle V enters the parking frame.

(Condition A1) An elapsed time that has been passed after the steering angle detected in step S116 becomes a value equal to or larger than a predefined steering angle (for example, 45 degrees) is shorter than or equal to a predefined time (for example, 20 sec).

(Condition A2) The angle α between the vehicle V and the parking frame L0 is smaller than or equal to a predefined angle (for example, 40 degrees).

(Condition A3) The distance D between the vehicle V and the parking frame L0 is shorter than or equal to a predefined distance (for example, 3 m).

It is to be noted that the processing of setting the parking frame entering certainty degree by the parking frame entering certainty degree set unit 38 may be used as the processing of determining whether or not the vehicle V enters the parking frame.

Furthermore, the processing used for determining whether or not the vehicle V enters the parking frame is not limited to the processing of using plural conditions as described above. One or more conditions of the above-mentioned three conditions may be used for the processing of determining. Furthermore, the processing of determining whether or not the vehicle V enters the parking frame may be performed by using the vehicle speed of the vehicle V.

In step S120, the processing of generating the acceleration suppression activation condition determination result signal, as an information signal including a determination result that an acceleration suppression control activation condition is not satisfied, is performed ("acceleration suppression activation condition is unsatisfied" in the drawing). When the processing of generating the acceleration suppression activation condition determination result signal including the determination result that the acceleration suppression control activation condition is not satisfied is performed in step S120, the processing performed by the acceleration suppression activation condition determination unit 34 proceeds to step S124.

In step S122, processing of generating the acceleration suppression activation condition determination result signal, as an information signal including the determination result that the acceleration suppression control activation condition is satisfied, is performed ("acceleration suppression activation condition is satisfied" in the drawing). When the processing of generating the acceleration suppression activation condition determination result signal including the determination result that the acceleration suppression control activation condition is satisfied is performed in step S122, the processing performed by the acceleration suppression activation condition determination unit 34 proceeds to step S124.

In step S124, processing of outputting the acceleration suppression activation condition determination result signal generated in step S120 or step S122 to the acceleration suppression command value computing unit 10J ("acceleration suppression activation condition determination result output" in the drawing) is performed. When the processing of outputting the acceleration suppression activation condition determination result signal to the acceleration suppression command value computing unit 10J is performed in step S124, the processing performed by the acceleration suppression activation condition determination unit 34 returns (RETURN) to step S100.

Figure 7:
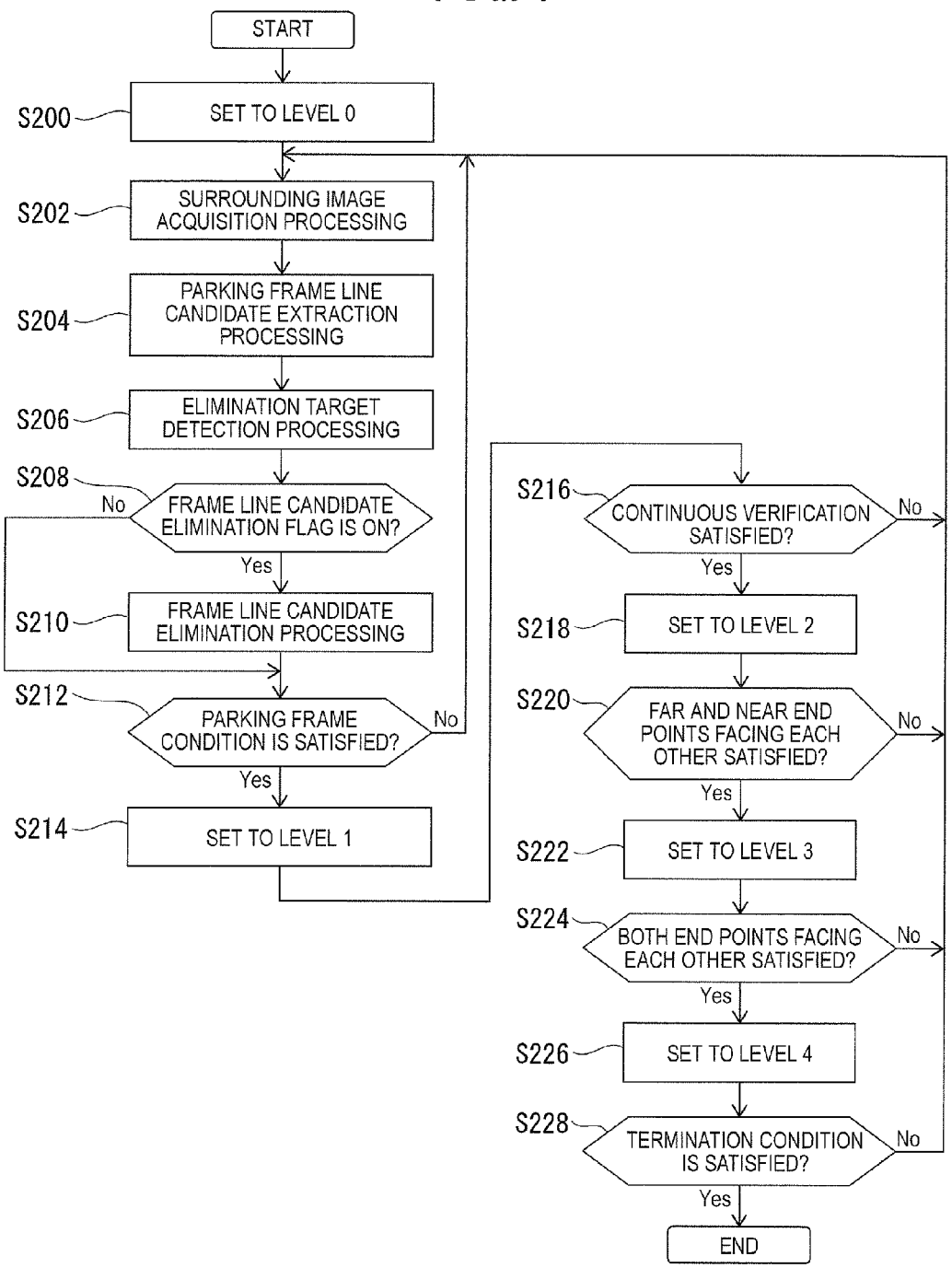
FIG. 7 is a flowchart illustrating processing by a parking frame certainty degree set unit of setting a parking frame certainty degree.

The processing by the parking frame certainty degree set unit 36 of setting the parking frame certainty degree will be described, by using FIG. 7 to FIG. 13C, and referring to FIG. 1 to FIG. 6. FIG. 7 is a flowchart illustrating the processing by the parking frame certainty degree set unit 36 of setting the parking frame certainty degree.

As illustrated in FIG. 7, when the parking frame certainty degree set unit 36 starts the processing (START), firstly, processing of setting a level of the parking frame certainty degree to a minimum (level 0) is performed in step S200 ("set to level 0" in the drawing). When the processing of setting the parking frame certainty degree to the level 0 is performed in step S200, the processing performed by the parking frame certainty degree set unit 36 proceeds to step S202.

In step S202, processing of acquiring the bird's-eye view image of surroundings of the vehicle V included in the bird's-eye view image signal received from the surrounding environment recognition information computing unit 10A and the individual image included in the individual image signal used for generating the bird's-eye view image ("surrounding image acquisition processing" in the drawing) is performed.

When the processing of acquiring the bird's-eye view image of surroundings of the vehicle V and the individual image used for generating the bird's-eye view image is performed in step S203, the processing performed by the parking frame certainty degree set unit 36 proceeds to step S204.

In step 204, firstly, processing of extracting a parking frame line candidate used for setting the parking frame certainty degree from the bird's-eye view image acquired in step S202 ("parking frame line candidate extraction processing" in the drawing) is performed.

When the state of the line that has been acquired satisfies all of the following three conditions (B1 to B3), the line is extracted as the parking frame line candidate.

(Condition B1) When there is a broken portion in the line indicated on the road surface, the broken portion is the part where the indicated line is spotted or blurred (for example, a part where the clarity is lower than that of the line and is higher than that of the road surface).

(Condition B2) The width of the line indicated on the road surface is equal to or larger than a predefined width (for example, 10 cm).

(Condition B3) The length of the line indicated on the road surface is equal to or longer than a predefined marking line length (for example, 2.5 m).

Note that the parking frame line candidate is a line (such as a white line) indicated on the road surface such as the parking frame line or the like. In the present embodiment, the pixels in the bird's-eye view image are scanned in a lateral direction to extract edge pixels having a brightness difference equal to or larger than a predefined first brightness threshold. That is, in the present embodiment, the first brightness threshold is a threshold of the brightness difference. Then, a line consisting of these edge pixels is acquired. Specifically, a difference of the adjacent pixels is calculated to extract the pixels having an absolute value in the difference is equal to or larger than the first brightness threshold, as the edge pixels. In this processing, for a line, such as a white line on the road, having a large brightness difference from the road surface and a width of three pixels and extending in the vertical direction of the image, an edge with a plus brightness difference and an edge with a minus brightness difference are extracted.

Next, from the parking frame line candidates extracted from one bird's-eye view image (a bird's-eye view image corresponding to the individual image), two lines adjoining each other in the bird's-eye view image are specified as one pair (hereinafter, may be referred to as "pairing"). It is to be noted that when three or more lines are extracted from the one bird's-eye view image, two or more pairs are specified with respective pairs of two lines adjoining each other among the three or more lines. When the processing of extracting the parking frame line candidates from the bird's-eye view image and of pairing the parking frame line candidates that has been extracted, is performed, the processing performed by the parking frame certainty degree set unit 36 proceeds to step S206.

In step S206, on the basis of the extraction result by step S204, processing of detecting a parking frame line candidate as an elimination target to be eliminated from the parking frame line candidates extracted from the bird's-eye view image of the front of the vehicle V in front-rear direction ("elimination target detection processing" in the drawing). When the processing of detecting a parking frame line candidate to be eliminated is performed in step S206, the processing performed by the parking frame certainty degree set unit 36 proceeds to step S208.

Now, a specific example of the processing performed in step S206 will be described below by using FIG. 8. It is to be noted that FIG. 8 is a flowchart illustrating the processing by the parking frame certainty degree set unit 36 of detecting the parking frame line candidate to be eliminated.

Figure 8:
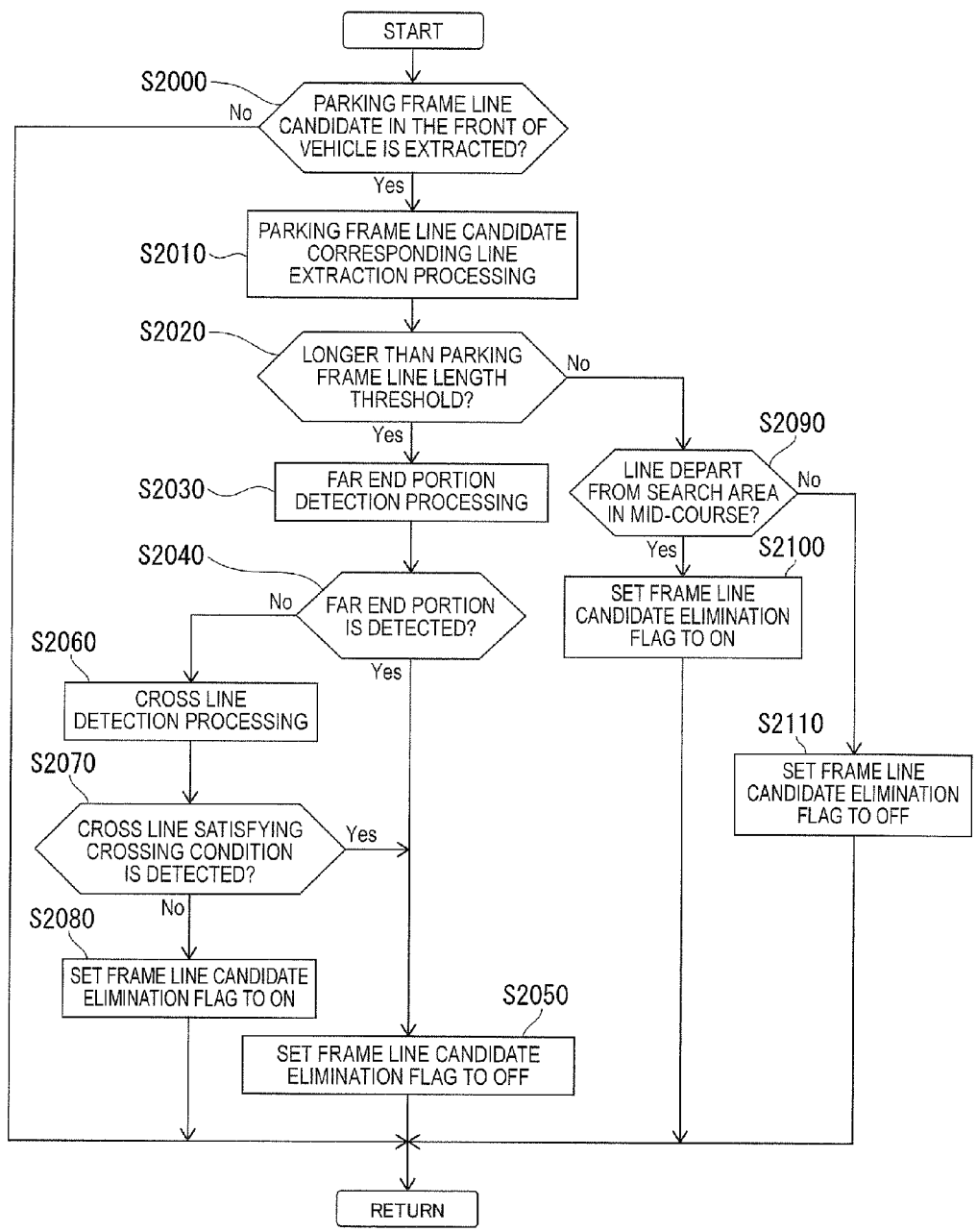
FIG. 8 is a flowchart illustrating processing by a parking frame certainty degree set unit 36 of detecting a parking frame line candidate to be eliminated.

In step S206, when the parking frame certainty degree set unit 36 starts the processing (START), firstly, processing of determining whether or not the parking frame line candidate is extracted from the bird's-eye view image of the front of the vehicle V ("parking frame line candidate in the front of vehicle is extracted?" in the drawing) is performed in step S2000, as illustrated in FIG. 8. In the present embodiment, it is determined whether or not a pair of the parking frame line candidates paired is extracted.

When it is determined that the pair of the parking frame line candidate is extracted from the bird's-eye view image of the front of the vehicle V ("Yes" in the drawing) in step S2000, the processing performed by the parking frame certainty degree set unit 36 proceeds to step S2010.

On the other hand, when it is determined that the pair of the parking frame line candidate is not extracted from the bird's-eye view image of the front of the vehicle V ("No" in the drawing) in step S2000, the processing performed by the parking frame certainty degree set unit 36 returns to the calling process.

Figure 9A:
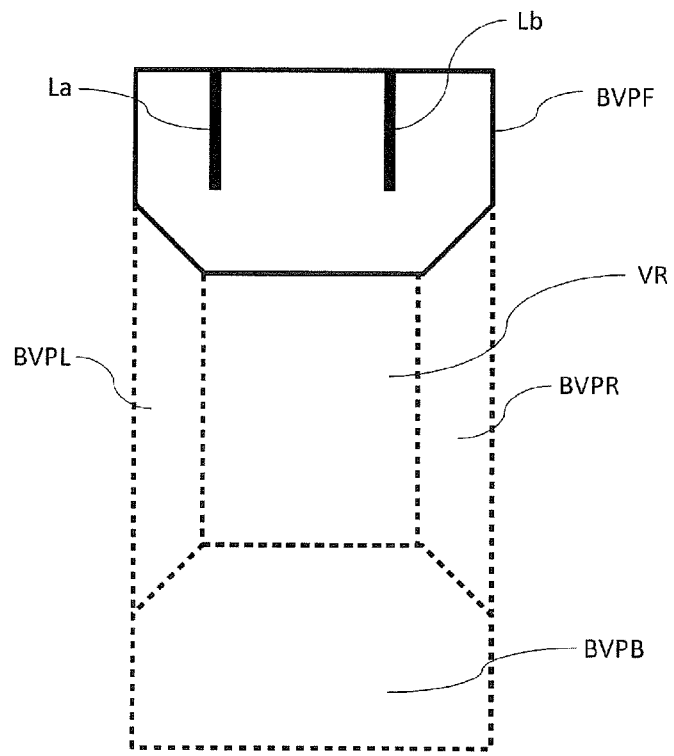
FIGS. 9A and 9B are views illustrating an example of a bird's-eye view image of surroundings of a vehicle V and illustrate examples of parking frame line candidate corresponding lines xLa and xLb corresponding to parking frame line candidates La and Lb.

In the present embodiment, the bird's-eye view image of surroundings of the vehicle V has a configuration illustrated in FIG. 9A. Note that FIG. 9A is a view illustrating an example of the bird's-eye view image of surroundings of the vehicle V. Such a bird's-eye view image may be acquired, for example, by setting a virtual view point at a position right above the vehicle V to look down the road surface environment, and by performing bird's-eye view conversion of the individual images corresponding to the respective cameras (the front camera 14F, the right side camera 14SR, the left side camera 14SL, and the rear camera 14R) by using a known conversion method (for example, geometric conversion or the like). In the present embodiment, portions of the individual images corresponding to the predefine region of the bird's-eye view are cut off (for example, a region within three meters from the vehicle), and the bird's-eye view conversion is performed on the portions of the images that has been cut off. Furthermore, the bird's-eye view image corresponding to the respective camera that has been acquired by the bird's-eye view conversion is synthesized with a prepared image VR of the vehicle when viewed from right above. In this way, the bird's-eye view image of surroundings of the vehicle V, which includes a front side bird's-eye view image BVPF, a back side bird's-eye view image BVPB, a left side bird's-eye view image BVPL, and a right side bird's-eye view image BVPR, illustrated in FIG. 9A is acquired.

Therefore, when a parking frame line candidates La and Lb which are paired as a pair of parking frame line candidates in the front side bird's-eye view image BVPF are extracted, as illustrated in the front side bird's-eye view image BVPF of FIG. 9A, it is determined that the a pair of parking frame line candidates is detected.

In step S2010, processing of extracting parking frame line candidate corresponding lines which correspond to the pair of the parking frame line candidates extracted in step S204 from the individual images corresponding to the front side bird's-eye view image BVPF ("parking frame line candidate corresponding line extraction processing" in the drawing) is performed. When the processing of extracting the parking frame line candidate corresponding lines from the individual images corresponding to the front side bird's-eye view image BVPF in step S2010, the processing performed by the parking frame certainty degree set unit 36 proceeds to step S2020.

Figure 9B:
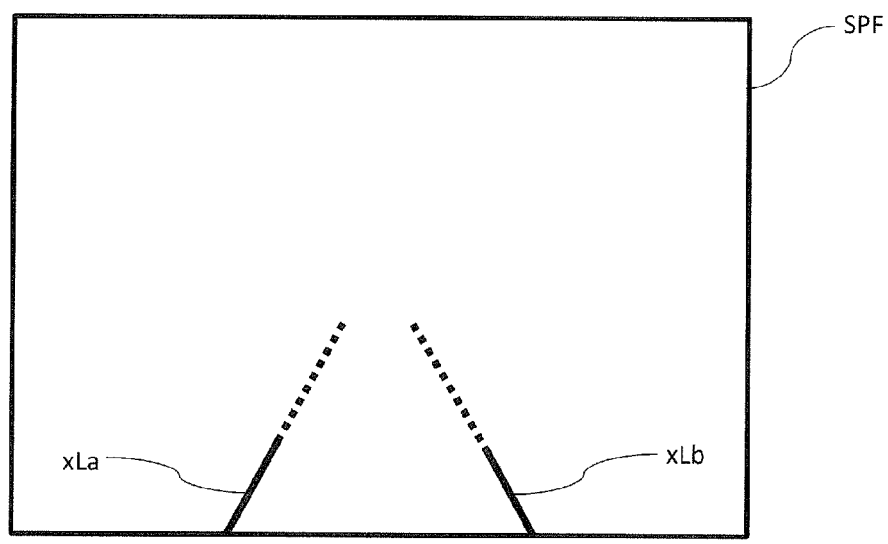

Now, a specific example of the processing performed in step S2010 will be described below by using FIG. 9A to FIG. 11B. FIG. 9B is a view illustrating examples of parking frame line candidate corresponding lines xLa and xLb corresponding to the parking frame line candidates La and Lb.

For example, the parking frame line candidate corresponding lines corresponding to the parking frame line candidates La and Lb illustrated in FIG. 9A, are lines (xLa and xLb) extending in a perspective direction of the image in the individual image SPF corresponding to the front side bird's-eye view image BVPF, as illustrated in FIG. 9B.

The solid lines of the parking frame line candidate corresponding lines xLa and xLb illustrated in FIG. 9B correspond to the parking frame line candidates La and Lb. On the other hand, the dotted lines of the parking frame line candidate corresponding lines xLa and xLb illustrated in FIG. 9B correspond to portions of the parking frame line candidate corresponding lines xLa and xLb which are not included in the front side bird's-eye view image BVPF. That is, as described above, the front side bird's-eye view image BVPF is generated by performing the bird's-eye view conversion on a portion of the individual image SPF. Thus, the front side bird's-eye view image BVPF only includes a portion of the individual image SPF. Therefore, as indicated by the dotted lines in FIG. 9B, the parking frame line candidates La and Lb extracted from the front side bird's-eye view image BVPF may extend further in the individual image SPF.

Based on this possibility, in the present embodiment, the parking frame line candidate corresponding lines xLa and xLb corresponding to the parking frame line candidates La and Lb are extracted from the individual image SPF firstly in step S2010.

Figure 10A:
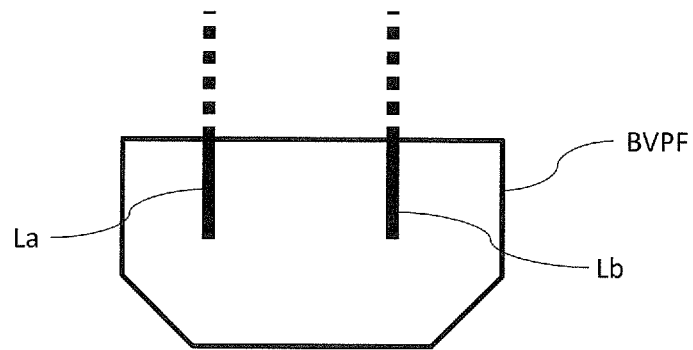
FIG. 10A is a view illustrating parking frame line candidates La and Lb extending to the outside of a front side bird's-eye view image BVPF while a vehicle V is traveling straight.

Note that FIG. 10A is a view illustrating the parking frame line candidates La and Lb extending to the outside of the front side bird's-eye view image BVPF while the vehicle V is traveling straight. Furthermore, FIG. 10B is a view illustrating an example of a search area set in the individual image SPF while the vehicle V is traveling straight.

Figure 10B:
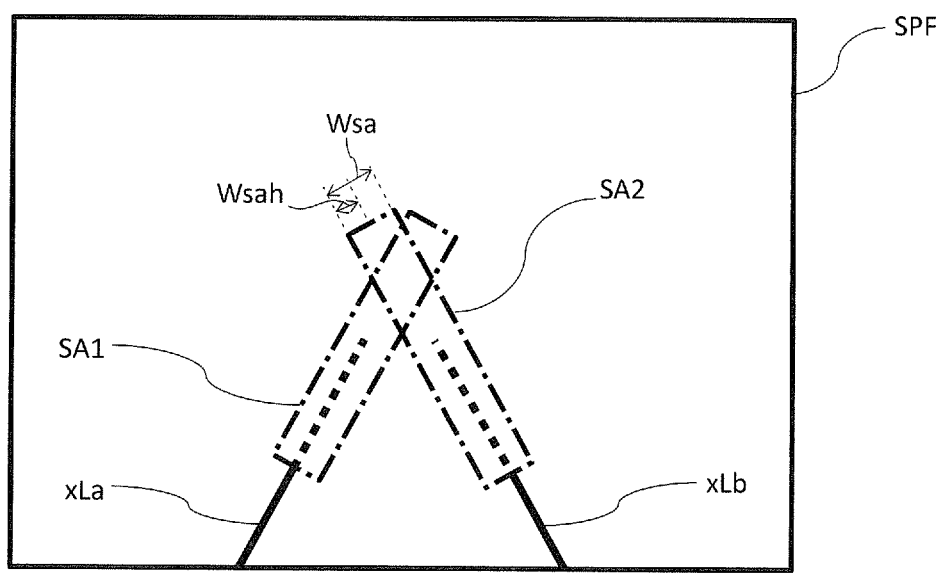
FIG. 10B is a view illustrating an example of a search area set in an individual image SPF while a vehicle V is traveling straight.

In the present embodiment, while the vehicle V is traveling straight, the dotted line outside the bird's-eye view image, which is estimated to be extending from the parking frame line candidates La and Lb as illustrated in FIG. 10A, are extracted from the individual image SPF illustrated in FIG. 10B. For this extraction, in the present embodiment, search areas SA1 and SA2 extending from far side end portions of the solid line of the parking frame line candidate corresponding lines xLa and xLb in the perspective direction of the image, are set as illustrated in FIG. 10B.

Note that the search area SA1 is a search area for searching, from the individual image SPF, a remaining part extending from the solid line of the parking frame line candidate corresponding line xLa, that is an extension line of the parking frame line candidate La. Furthermore, the search area SA2 is a search area for searching, from the individual image SPF, a remaining part extending from the solid line of the parking frame line candidate corresponding line xLb, which is an extension line of the parking frame line candidate Lb. Furthermore, the search areas SA1 and SA2 have a predefined width Wsah (hereinafter, may be referred to as "half width Wsah") centered on the solid lines of the parking frame line candidate corresponding lines xLa and xLa, respectively, in a direction perpendicular to the solid line. That is, the search areas SA1 and SA2 each have a full width Wsa ((half width Wsah)×2). It is to be noted that the half width Wsah is set to, for example, a length in the individual images corresponding to 50 cm of an actual length.

Furthermore, in the present embodiment, the lengths of the search areas SA1 and SA2 in the perspective direction are each set to a predefined length (for example, a length in the individual images corresponding to 8 cm of an actual length).

Furthermore, in the present embodiment, edge pixels having a brightness difference equal to or larger than a predefined second brightness threshold smaller than the first brightness threshold used in the above-mentioned detection of the parking frame line candidate are extracted from the search areas SA1 and SA2, respectively. In this way, edge pixels of the remaining part of the parking frame line candidate corresponding lines xLa and xLa (the extension portions of the parking frame line candidates La and Lb) are extracted from the search areas SA1 and SA2. Then, the extension portions extending from portions of the parking frame line candidate corresponding lines xLa and xLa corresponding to the parking frame line candidates La and Lb in the search areas SA1 and SA2 are extracted on the basis of the edge pixels that have been extracted. It is to be noted that the reasons why the second brightness threshold is smaller than the first brightness threshold is that the lines extending further in the image has a lower brightness than that of the near line, and thus is less easily extracted.

Figure 11A:
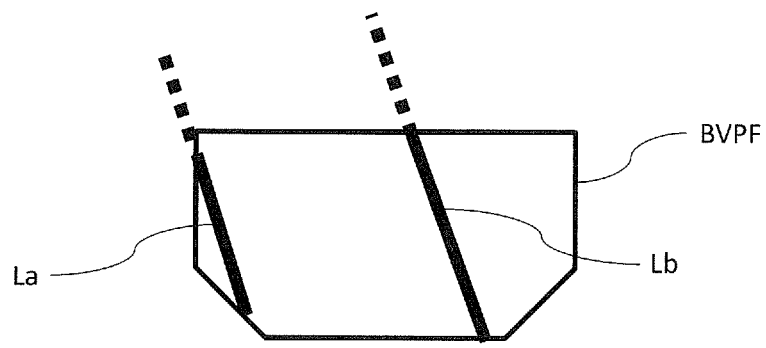
FIG. 11A is a view illustrating parking frame line candidates La and Lb extending to the outside of a front side bird's-eye view image BVPF while a vehicle V is turning.

Furthermore, FIG. 11A is a view illustrating the parking frame line candidates La and Lb extending to the outside of the front side bird's-eye view image BVPF while the vehicle V is turning. Furthermore, FIG. 11B is a view illustrating an example of the search area set in the individual image SPF while the vehicle V is turning.

Figure 11B:
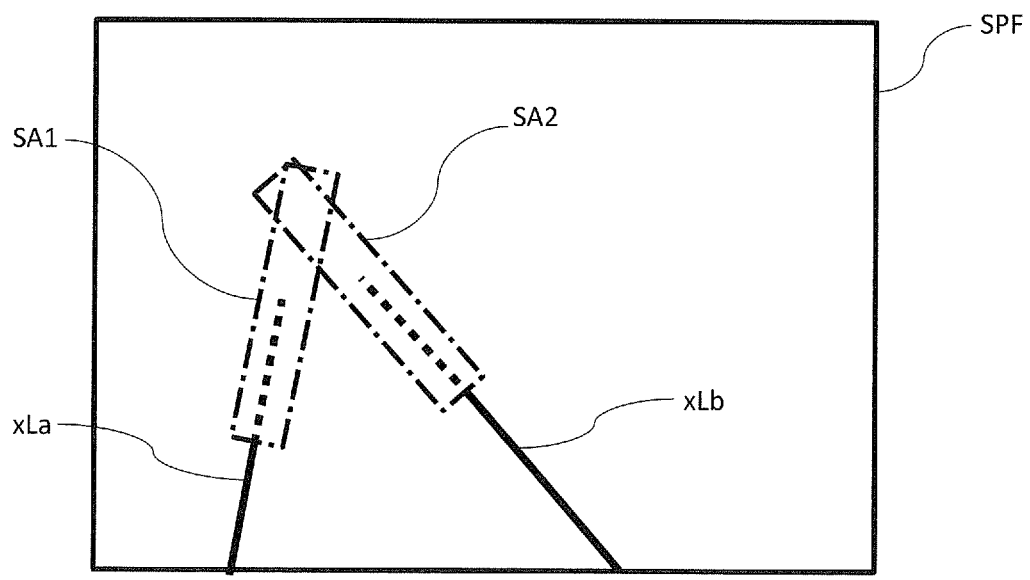
FIG. 11B is a view illustrating an example of a search area set in an individual image SPF while a vehicle V is turning.

As illustrated in FIGS. 11A and 11B, while the vehicle V is turning (left turning in the example illustrated in FIGS. 11A and 11B), the lines that have been extracted become inclined lines depending on the turning direction of the vehicle V. In this case also, as illustrated in FIG. 11B, the search areas SA1 and SA2 are set similarly to the above-mentioned case where the vehicle V travels straight. Then, the extension portions extending from portions of the parking frame line candidate corresponding lines xLa and xLa corresponding to the parking frame line candidates La and Lb are extracted from the search areas SA1 and SA2, by using the second brightness threshold.

It is to be noted that, in the present embodiment, the threshold vehicle speed is set to 15 km/h, and the acceleration suppression control is not activated while the vehicle V travels at a speed higher than 15 km/h.

Therefore, the elimination target detection processing of the present embodiment may be performed, only when the vehicle turning right or left performs a turning motion at a turning angle equal to or larger than a predefined turning angle at which the vehicle speed of the vehicle V easily becomes lower than 15 km/h. In this case, information for computing a turning angle, such as a steering angle or the like is acquired before the above-mentioned step S2000, and then it is determined whether or not the vehicle performs the turning motion. When it is determined that the vehicle performs the turning motion, the processing proceeds to step S2000.

In step S2020, processing of determining whether or not the line length of the parking frame line candidate corresponding line that has been extracted is equal to or longer then a predefined parking frame line length threshold Lth1 ("longer than parking frame line length threshold?" in the drawing) is performed.

Figure 12A:
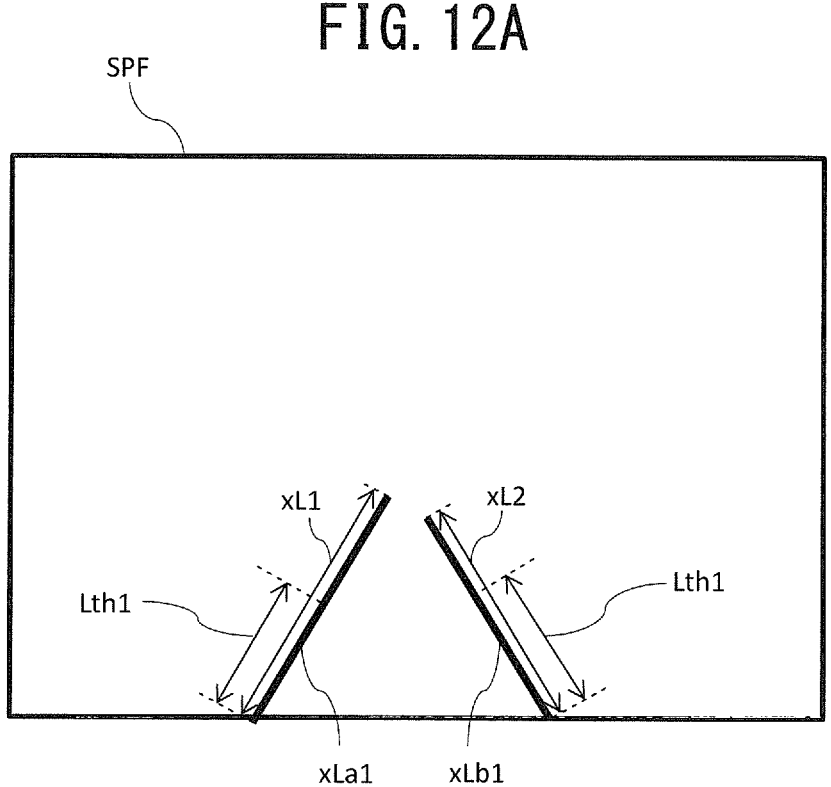
FIG. 12A is a view illustrating an example of a relationship between a parking frame line length threshold Lth1 and parking frame line candidate corresponding lines xLa and xLb extracted from the individual image SPF while a vehicle V is traveling straight.
Figure 12B:
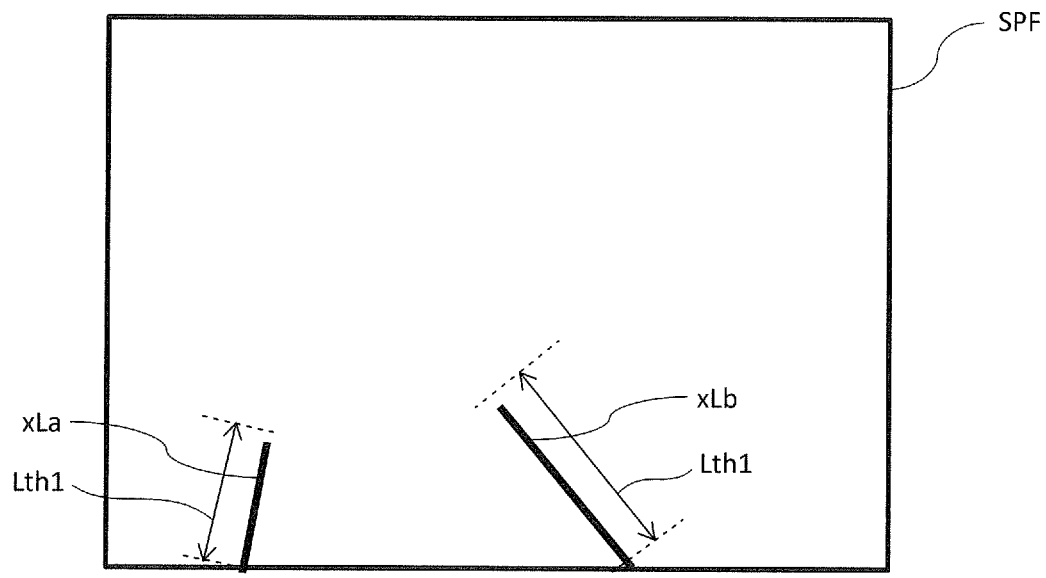
FIG. 12B is a view illustrating an example of a relationship between a parking frame line length threshold Lth1 and parking frame line candidate corresponding lines xLa and xLb extracted from the individual image SPF while a vehicle V is turning.

Note that FIG. 12A is a view illustrating an example of a relationship between the parking frame line length threshold Lth1 and the parking frame line candidate corresponding lines xLa and xLb extracted from the individual image SPF while the vehicle V is traveling straight. FIG. 12B is a view illustrating an example of a relationship between the parking frame line length threshold Lth1 and the parking frame line candidate corresponding lines xLa and xLb extracted from the individual image SPF while the vehicle V is turning.

Note that the parking frame line candidate corresponding lines xLa and xLb illustrated in FIGS. 12A and 12B are a combination of portions corresponding to the parking frame line candidates La and Lb, and portions extracted from the search areas SA1 and SA2 by making a search, respectively. Then, the lengths of the parking frame line candidate corresponding lines xLa and xLb are compared with the parking frame line length threshold Lth1 to determine whether or not the lengths of the parking frame line candidate corresponding lines xLa and xLb are longer than the parking frame line length threshold Lth1. Note that the parking frame line length threshold Lth1 is set on the basis of a length of the parking frame line in the longitudinal direction forming an existing parking frame. For example, the parking frame line length threshold Lth1 is set to a length in the individual images corresponding to 6.5 m of an actual length.

In the example illustrated in FIG. 12A, each of the lengths of the parking frame line candidate corresponding lines xLa and xLb are longer than the parking frame line length threshold Lth1. Therefore, in this case, it is determined that the length of the parking frame line candidate corresponding line is longer than the parking frame line length threshold Lth1, in step S2020. In this case, the processing performed by the parking frame certainty degree set unit 36 proceeds to step S2030. It is to be noted that, FIG. 12A illustrates an example in which each of the lengths of the parking frame line candidate corresponding lines xLa and xLb is longer than the parking frame line length threshold Lth1. However, in the present embodiment, it is determined that the parking frame line candidate corresponding line is longer than the parking frame line length threshold Lth1 when any one of the parking frame line candidate corresponding lines xLa and xLb is longer than the parking frame line length threshold Lth1.

On the other hand, in the example illustrated in FIG. 12B, each of the lengths of the parking frame line candidate corresponding lines xLa and xLb is equal to or shorter than the parking frame line length threshold Lth1. Therefore, in this case, it is determined that the length of the parking frame line candidate corresponding line is not longer than the parking frame line length threshold Lth1, in step S2020. In this case, the processing performed by the parking frame certainty degree set unit 36 proceeds to step S2000.

In step S2030, processing of detecting far end portions of the pair of the parking frame line candidates extracted from the front side bird's-eye view image BVPF, which are end portions on the farther side from the vehicle V ("far end portion detection processing" in the drawing) is performed. When the processing of detecting the far end portions is performed in S2030, the processing performed by the parking frame certainty degree set unit 36 proceeds to step S2040.

Figure 13A:
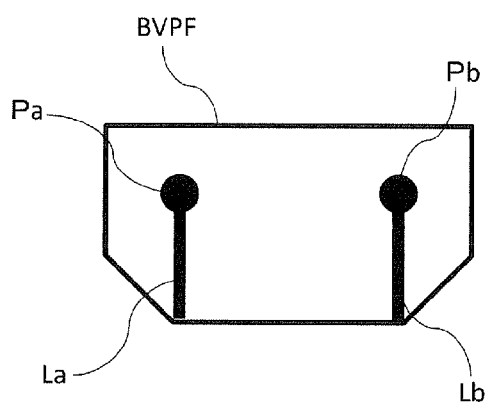
FIGS. 13A to 13C are views illustrating examples of far end portions detected from a front side bird's-eye view image BVPF.
Figure 13B:
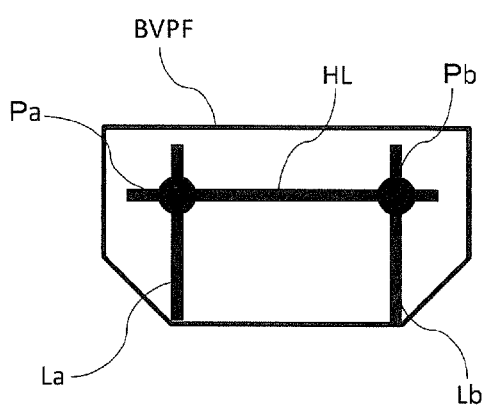
Figure 13C:
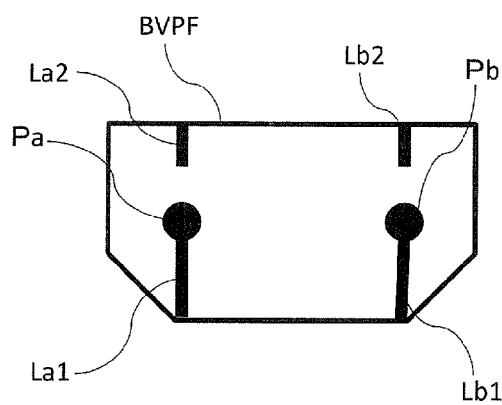

Now, a specific example of the processing performed in step S2030 will be described below by using FIGS. 13A to 13C. FIGS. 13A to 13C are views illustrating examples of the far end portions detected from the front side bird's-eye view image BVPF. In the example illustrated in FIG. 13A, far end portions Pa and Pb of the parking frame line candidates La and Lb are detected in the front side bird's-eye view image BVPF.

Furthermore, in the example illustrated in FIG. 13B, far end portions Pa and Pb are detected in the front side bird's-eye view image BVPF, as crossing points with a horizontal line HL. Furthermore, in the example illustrated in FIG. 13C, far end portions Pa and Pb of the parking frame line candidates La and Lb are detected although there are disconnected lines La2 and Lb2 of the parking frame line candidates La and Lb in the front side bird's-eye view image BVPF.

In this way, something that can be estimated to be the end portion of the parking frame line which forms the parking frame is detected.

In step S2040, processing of determining whether or not far end portions corresponding to the pair of the parking frame line candidates are detected in the front side bird's-eye view image BVPF ("far end part is detected?" in the drawing) is performed. Specifically, it is determined whether or not the far end portions exemplified in the above-mentioned FIGS. 13A to 13C are detected. When it is determined that the far end portion is detected in step S2040, the processing performed by the parking frame certainty degree set unit 36 proceeds to step S2050.

On the other hand, when it is determined that no far end portion is detected in step S2040, the processing performed by the parking frame certainty degree set unit 36 proceeds to step S2060.

In step S2050, processing of setting a predefined frame line candidate elimination flag to OFF ("set frame line candidate elimination flag to OFF" in the drawing) is performed.

Note that the set frame line candidate elimination flag is a frag to determine whether or not the parking frame line candidate that has been extracted is an elimination target of the parking frame. In the present embodiment, the frame line candidate elimination flag is set for each of the pair of the parking frame line candidates that has been extracted. The pair of the parking frame line candidate for which the frame line candidate elimination flag is set to ON is set as the elimination target to be eliminated from the candidates to be detected as the parking frame. On the other hand, the pair of the parking frame line candidate for which the frame line candidate elimination flag is set to OFF is set as the candidate to be detected as the parking frame.

When the processing of setting the frame line candidate elimination flag to OFF is performed in step S2050, the processing performed by the parking frame certainty degree set unit 36 returns to the calling process (RETURN).

On the other hand, in step S2060, processing of detecting a cross line crossing the pair of the parking frame line candidate from the individual image SPF ("cross line detection processing" in the drawing) is performed. When the processing of detecting the cross line is performed in step S2060, the processing performed by the parking frame certainty degree set unit 36 proceeds to step S2070. In the present embodiment, the cross line is detected by extracting an edge pixel having a brightness difference larger than a third brightness threshold in the individual image SPF, by using the third brightness threshold larger than the first brightness threshold used in extracting the parking frame line candidate from the front side bird's-eye view image BVPF.

In step S2070, processing of determining whether or not a cross line satisfying a predefined crossing condition is detected ("cross line satisfying crossing condition is detected?") is performed on the basis of detection result by step S2060.

Note that satisfying the crossing condition means a case where all of the following three conditions (C1 to C3) are satisfied.

(Condition C1) The cross line CL detected from the individual image SPF crosses the parking frame line candidate corresponding lines xLa and xLb at a length position equal to or shorter than the parking frame line length threshold Lth1.

(Condition C2) The length of the cross line CL is equal to or longer than a predefined cross line length threshold Lth2. It is to be noted that the cross line length threshold Lth2 is set to be equal to or longer than a length corresponding to a width of at least two parking frames, in one embodiment.

(Condition C3) The cross line CL crosses the parking frame line candidate corresponding lines xLa and xLb at a crossing angle equal to or smaller than a predefined crossing angle threshold. This is a condition for detecting the presence of a horizontal line forming a parking frame having a letter H shape. The cross line that falls outside the range of the crossing angle of the horizontal line of the parking frame having the letter H shape is eliminated.

Figure 14:
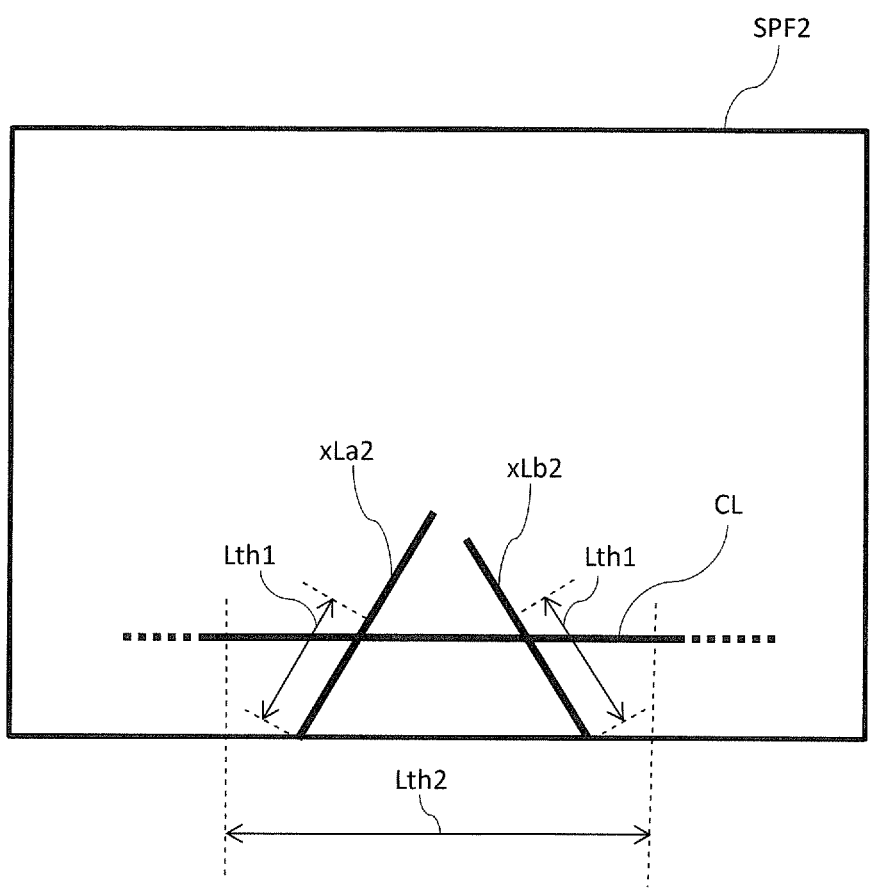
FIG. 14 is a view illustrating an example of a cross line CL crossing parking frame line candidate corresponding lines xLa and xLb.

Now, a specific example of the processing performed in step S2070 will be described below by using FIG. 14. FIG. 14 is a view illustrating an example of the cross line CL crossing the parking frame line candidate corresponding lines xLa and xLb.

As illustrated in FIG. 14, the parking frame line candidate corresponding lines xLa2 and xLb2 are detected from the individual image SPF, and the cross line CL crosses the parking frame line candidate corresponding lines xLa2 and xLb2. In the example illustrated in FIG. 14, the length of each of the parking frame line candidate corresponding lines xLa2 and xLb2 is longer than the parking frame line length threshold Lth1. Furthermore, The cross line CL crosses the parking frame line candidate corresponding lines xLa2 and xLb2 at a length position equal to or shorter than the parking frame line length threshold Lth1 (The condition C1 is satisfied). In addition, the length of the cross line CL is equal to or longer than the cross line length threshold Lth2 (The condition C2 is satisfied). Furthermore, the cross line CL is substantially perpendicular to the parking frame line candidate corresponding lines xLa2 and xLb2 (The condition C3 is satisfied).

From the above, in the example illustrated in FIG. 14, the cross line CL that has been detected satisfies the above-mentioned conditions C1 to C3. In this case, it is determined that the crossing condition is satisfied, and the processing performed by the parking frame certainty degree set unit 36 proceeds to step S2050.

On the other hand, when it is determined that at least one of the above-mentioned conditions C1 to C3 is not satisfied, and thus the crossing condition is not satisfied, the processing performed by the parking frame certainty degree set unit 36 proceeds to step S2080.

In step 2080, processing of setting the frame line candidate elimination flag to ON ("set frame line candidate elimination flag to ON" in the drawing) is performed. When the processing of setting the frame line candidate elimination flag to ON is performed in step S2080, the processing performed by the parking frame certainty degree set unit 36 returns to the calling process (RETURN).

In step S2090, processing of determining whether or not the line detected in the search area departs from the search area in mid-course ("line depart from search area in mid-course?" in the drawing) is performed.

When it is determined that the line departs from the search area in mid-course in step S2090, the processing performed by the parking frame certainty degree set unit 36 proceeds to step S2100.

On the other hand, it is determined that the line does not depart from the search area in mid-course in step S2090, the processing performed by the parking frame certainty degree set unit 36 proceeds to step S2110.

In step 2100, processing of setting the frame line candidate elimination flag to ON ("set frame line candidate elimination flag to ON" in the drawing) is performed. When the processing of setting the frame line candidate elimination flag to ON is performed in step S2100, the processing performed by the parking frame certainty degree set unit 36 returns to the calling process (RETURN).

Figure 15:
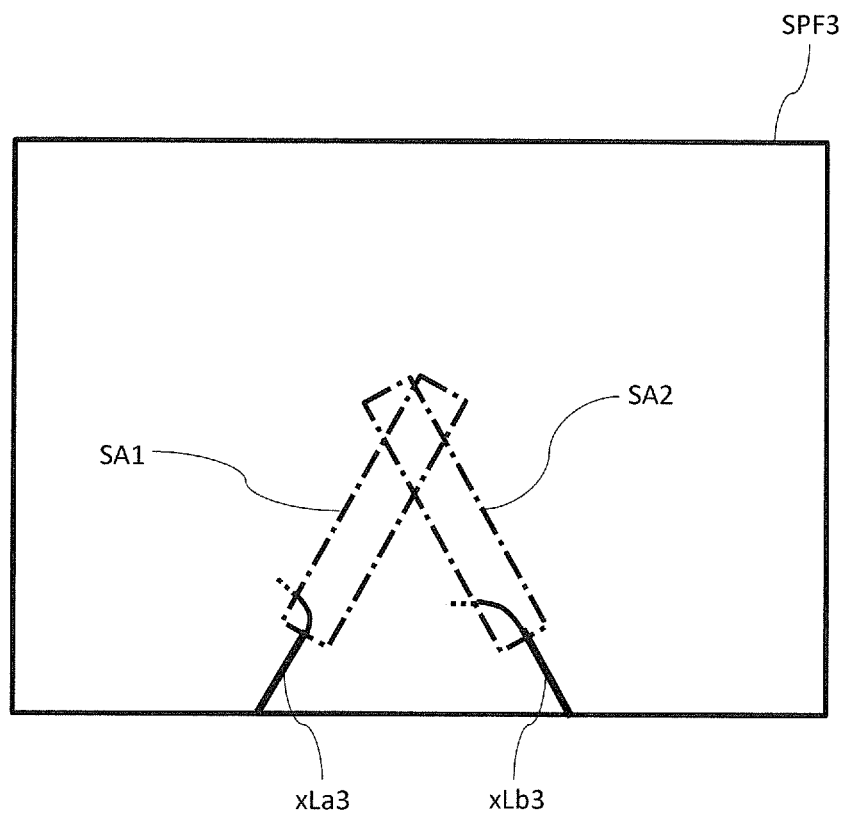
FIG. 15 is a view illustrating example of a parking frame line candidate corresponding line which departs from a search area in mid-course.

Now, a specific example of the processing performed in steps S2090 to S2010 will be described below by using FIG. 15. FIG. 15 is a view illustrating example of a parking frame line candidate corresponding line which departs from a search area in mid-course.

The situation illustrated in FIG. 15 in which the parking frame line candidate corresponding lines xLa3 and xLb3 depart from the search areas SA1 and SA2 in the individual image SPF3 occurs, for example, is caused due to a behavior of the vehicle V such as pitching or the like. In such a situation, the line candidate corresponding lines xLa3 and xLb3 may extend further. Therefore, in the present embodiment, the frame line candidate elimination flag is set to ON in such a situation to set the parking frame line candidates corresponding to the parking frame line candidate corresponding lines xLa3 and xLb3 as the elimination target.

On the other hand, in step 2110, processing of setting the frame line candidate elimination flag to OFF ("set frame line candidate elimination flag to OFF" in the drawing) is performed. When the processing of setting the frame line candidate elimination flag to OFF is performed in step S2110, the processing performed by the parking frame certainty degree set unit 36 returns to the calling process (RETURN).

That is, when the length of the parking frame line candidate corresponding line is equal to or shorter than the parking frame line length threshold Lth1, the parking frame line candidates corresponding to the parking frame line candidate corresponding line is eliminated from the elimination targets.

Referring back to FIG. 7, is step S208, processing of determining whether or not there is a parking frame line candidate for which the frame line candidate elimination flag is set to ON ("frame line candidate elimination flag is ON?" in the drawing) is performed on the basis of the processing result of the elimination target detection processing in step S206.

When it is determined that the frame line candidate elimination flag is ON in step S208 ("Yes" in the drawing), the processing performed by the parking frame certainty degree set unit 36 proceeds to step S210.

On the other hand, when it is determined that the frame line candidate elimination flag is OFF in step S208 ("No" in the drawing), the processing performed by the parking frame certainty degree set unit 36 proceeds to step S212.

In step S210, processing of eliminating the pair of parking frame line candidates for which the frame line candidate elimination flag is set to ON out of the pairs of parking frame line candidates extracted in step S204 from candidates to be detected as the parking frames ("frame line candidate elimination processing" in the drawing) is performed. Specifically, the information of the corresponding parking frame line candidate is deleted from the memory. When the processing of eliminating the pair of parking frame line candidates from the candidates to be detected as the parking frames in step S210, the processing performed by the parking frame certainty degree set unit 36 proceeds to step S212.

In step S212, processing of determining whether or not the pair of parking frame line candidates is extracted in step S204 or the pair of parking frame line candidates out of the pairs extracted in step S204, which is not eliminated by the frame line candidate elimination processing in step 210, satisfies a condition of a line forming the parking frame is performed. This processing corresponds to "parking frame condition is satisfied?" in the drawing.

When it is determined that the pair of parking frame line candidates to be determined does not satisfy the condition of the line forming the parking frame ("No" in the drawing) in step S212, the processing performed by the parking frame certainty degree set unit 36 proceeds to step S202.

On the other hand, when it is determined that the pair of parking frame line candidates to be determined satisfies the condition of the line forming the parking frame ("Yes" in the drawing) in step S212, the processing performed by the parking frame certainty degree set unit 36 proceeds to step S214. It is to be noted that the processing in step S212 is performed, for example, by referring to the bird's-eye view image signal received from the surrounding environment recognition information computing unit 10A.

Now, a specific example of processing performed in step S212 will be described by using FIGS. 16A to 16D. It is to be noted that FIGS. 16A to 16D are views illustrating the processing performed by the parking frame certainty degree set unit 36. Furthermore, in FIGS. 16A to 16D, a symbol "PE" indicates a region indicative of an image captured by the front camera 14F in the bird's-eye view images.

In step S212, when all of following four conditions (D1 to D4), for example, are satisfied for the two lines paired which are a pair of the target parking frame line candidates to be determined, it is determined that the target parking frame line candidates satisfies the condition of the line forming the parking line.

Figure 16A:
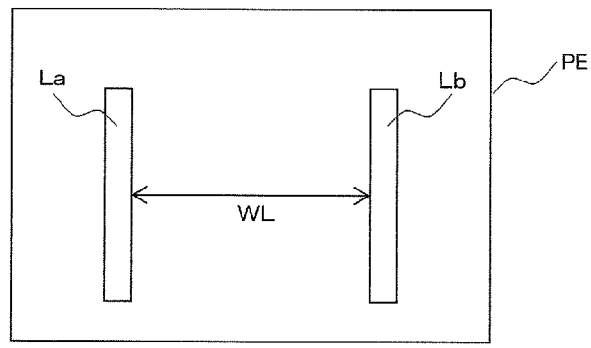
FIGS. 16A to 16D are views illustrating processing performed by a parking frame certainty degree set unit.

(Condition D1) As illustrated in FIG. 16A, a width WL between the two lines paired (indicated by a symbol "La" and a symbol "Lb" in the drawing) is smaller than or equal to a predefined pairing width (for example, 2.5 m).

Figure 16B:
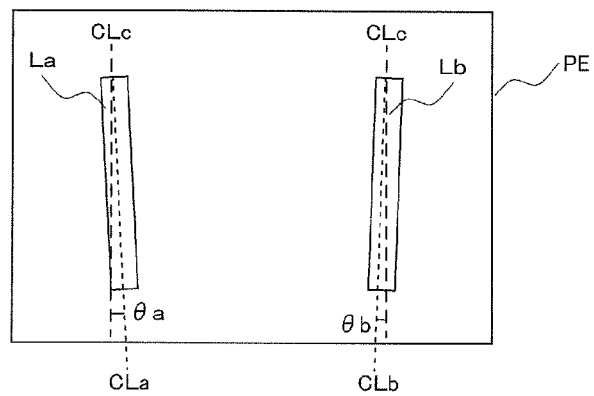

(Condition D2) As illustrated in FIG. 16B, an angle between the line La and the line Lb (parallel degree) is smaller than or equal to a predefined angle (for example, 3°). It is to be noted that, in FIG. 16B, a reference line (line extending in a vertical direction of the region PE) is indicated by a dot line with a symbol "CLc", a central axis of the line La is indicated by a broken line with a symbol "CLa", and a central axis of the line Lb is indicated by a broken line with a symbol "CLb". Furthermore, an inclination angle of the central axis CLa relative to the reference line CLc is indicated by a symbol "θa", and an inclination angle of the central axis CLb relative to the reference line CLc is indicated by a symbol "θb". Therefore, when a conditional expression of $|θa-θb|≤3°$ is satisfied, Condition D2 is satisfied.

Figure 16C:
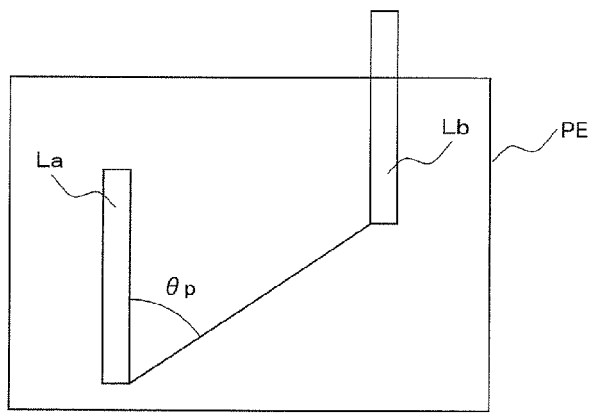

(Condition D3) As illustrated in FIG. 16C, the angle θ between a virtual straight line connecting an end of the line La on the vehicle V side (an end on the lower side in the drawing) and an end of the line Lb on the vehicle V side, and the line L closer to the vehicle V is equal to or larger than a predefined deviation angle (for example, 45°).

Figure 16D:
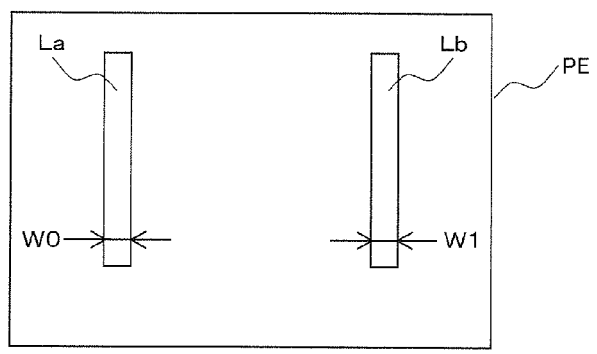

(Condition D4) As illustrated in FIG. 16D, an absolute value (|W0−W1|) of a difference between the line width W0 of the line La and the line width W1 of the line Lb is smaller than or equal to a predefined line width (for example, 10 cm).

It is to be noted that in the processing of determining whether or not the above-described four conditions (D1 to D4) are satisfied, when, for example, the length of at least one of the line La and the line Lb is broken, for example, in two meters or so, the processing continues with the line of four meters extended with a virtual line of two meters or so.

In step S214, processing of setting the level of the parking frame certainty degree to a one-stage higher level (level 1) than the minimum (level 0) is performed ("set to level 1" in the drawing). When the processing of setting the parking frame certainty degree to the level 1 is performed in step S214, the processing performed by the parking frame certainty degree set unit 36 proceeds to step S216.

In step S216, processing of determining whether or not the satisfaction of the condition is continuously verified in the processing of step S212 after the processing of step S212 starts until the travel distance of the vehicle V reaches a predefined travel distance is performed ("continuous verification satisfied?" in the drawing). It is to be noted that, for example, the predefined travel distance is set within a range of 1 m to 2.5 m depending on the data of the vehicle V, or whether the vehicle travels forward or backward.

Furthermore, the processing in step S216 is performed by referring to, for example, the bird's-eye view image signal received from the surrounding environment recognition information computing unit 10A and the vehicle speed computed value signal received from the vehicle speed computing unit 10B.

When it is determined that the satisfaction of the condition is not continuously verified in the processing of step S212 ("No" in the drawing) in step S216, the processing performed by the parking frame certainty degree set unit 36 proceeds to step S202.

On the other hand, when it is determined that the satisfaction of the condition is continuously verified in the processing of step S212 ("Yes" in the drawing) in step S216, the processing performed by the parking frame certainty degree set unit 36 proceeds to step S218.

Figure 17:
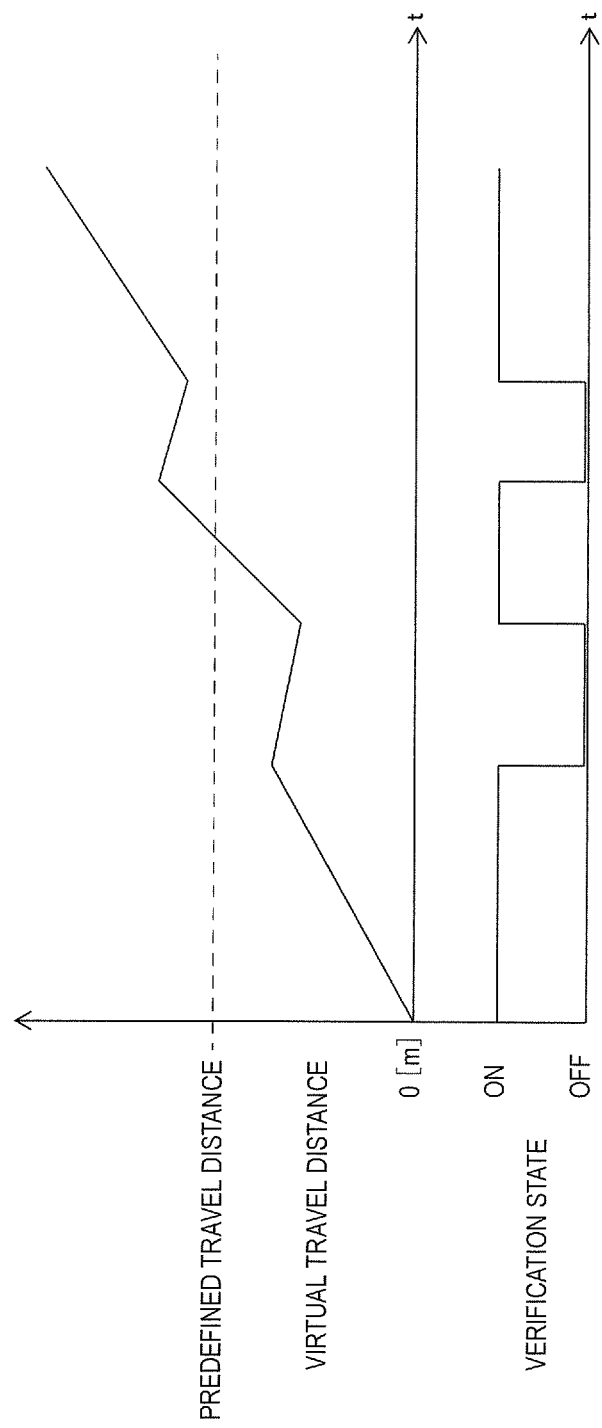
FIG. 17 is a view illustrating processing performed by a parking frame certainty degree set unit.

Note that, in the processing performed in step S216, for example, as illustrated in FIG. 17, the travel distance of the vehicle V is virtually computed depending on the state of verifying the satisfaction of the condition in the processing of step S212 and the state of not verifying the satisfaction of the condition in the processing of step S212. It is to be noted that FIG. 17 is a view illustrating the processing performed by the parking frame certainty degree set unit 36. Furthermore, in a region indicated by "verification state" in FIG. 17, "ON" indicates the state where the satisfaction of the condition is verified in the processing of step S212, whereas "OFF" indicates the state where the satisfaction of the condition is not verified in the processing of step S212. Furthermore, in FIG. 17, "virtual travel distance" indicates the travel distance of the vehicle V that has been virtually computed.

When the state where the satisfaction of the condition is verified in the processing of step S212 is "ON", as illustrated in FIG. 17, the virtual travel distance increases. On the other hand, when the state where the satisfaction of the condition is verified in the processing of step S212 is "OFF", the virtual travel distance decreases.

It is to be noted that, in the present embodiment, as an example, a case where an inclination (increasing gain) when the virtual travel distance increases is set larger than an inclination (decreasing gain) when the virtual travel distance decreases will be described. That is, if the state where the "verification state" is "ON" and the state where the "verification state" is "OFF" have the same period of time, the virtual travel distance will be increased.

Then, when the virtual travel distance reaches the predefined travel distance without returning to the initial value (0 m in the drawing), it is determined that the satisfaction of the condition is continuously verified in the processing of step S212.

In step S218, processing of setting the level of the parking frame certainty degree to a two-stage higher level (level 2) than the minimum (level 0) is performed ("set to level 2" in the drawing). When the processing of setting the parking frame certainty degree to the level 2 in step S218, the processing performed by the parking frame certainty degree set unit 36 proceeds to step S220.

In step S220, with respect to the lines La and Lb which are continuously verified in the processing of step S212, end points of the lines La and Lb located on the same side (near side end points or far side end points) with the vehicle V being used as a reference are respectively detected.

Then, processing of determining whether or not the end points located on the same side face each other in the direction of the width WL ("far and near end points facing each other satisfied?" in the drawing) is performed. It is to be noted that the processing in step S220 is performed, for example, by referring to the bird's-eye view image signal received from the surrounding environment recognition information computing unit 10A and the vehicle speed computed value signal received from the vehicle speed computing unit 10B.

When it is determined that the end points located on the same side do not face each other in the direction of the width WL in step S220 ("No" in the drawing), the processing performed by the parking frame certainty degree set unit 36 proceeds to step S222.

On the other hand, when it is determined that the end points located on the same side face each other in the direction of the width WL in step S220 ("Yes" in the drawing), the processing performed by the parking frame certainty degree set unit 36 proceeds to step S202.

In step S222, processing of setting the level of the parking frame certainty degree to a three-stage higher level (level 3) than the minimum (level 0) is performed ("set to level 3" in the drawing). When the processing of setting the parking frame certainty degree to the level 3 in step S222, the processing performed by the parking frame certainty degree set unit 36 proceeds to step S224.

In step S224, with respect to the lines La and Lb in which the end points thereof located on the same side are determined to be facing each other in the direction of the width WL in the processing of step S220, other end points thereof located on the other side are detected. That is, when the near side end points (one side) of the lines La and Lb are detected in the processing of step S220, the far side end points (the other side) of the lines La and Lb are detected in step S224.

Then, processing of determining whether or not the end points located on the other side face each other in the direction of the width WL ("both end points facing each other satisfied?" in the drawing) is performed. It is to be noted that the processing in step S224 is performed, for example, by referring to the bird's-eye view image signal received from the surrounding environment recognition information computing unit 10A and the vehicle speed computed value signal received from the vehicle speed computing unit 10B.

It is to be noted that when the end points of the lines La and Lb are detected, for example, an end point of a straight line like an end point of a line as illustrated in FIG. 4A, an end point having a letter U shape like an upper end point of a line as illustrated in FIG. 4G, and a crossing point of a double line and a horizontal line as illustrated in FIG. 4O are all processed as an end point of one straight line. Similarly, an end point of a double line like an upper end point of a line as illustrated in FIG. 4H and an end point having a gap portion in a letter U shaped curved line like an upper end point of a line as illustrated in FIG. 4M are all processed as an end point of one straight line.

Furthermore, when the end points of the lines La and Lb are detected, for example, a crossing point of slanted double lines extending in top-bottom direction and a single straight line extending in the left-right direction illustrated in FIG. 4N is not processed (recognized) as an end point. This is because, in detection of the end point, the end point is detected by scanning in a lateral direction in a region indicative of the captured image. Furthermore, for example, since a region indicated by a white square in FIG. 4P indicates an object on the road, such as a pole or the like, an end point of such an object is not detected, either.

When it is determined in step S224 that the end points located on the other side do not face each other in the direction of the width WL ("No" in the drawing), the processing performed by the parking frame certainty degree set unit 36 proceeds to step S202.

On the other hand, when it is determined in step S224 that the end points located on the other side face each other in the direction of the width WL ("Yes" in the drawing), the processing performed by the parking frame certainty degree set unit 36 proceeds to step S226.

In step S226, processing of setting the level of the parking frame certainty degree to a four-stage higher (level 4) than the minimum (level 0) is performed ("set to level 4" in the drawing). When the processing of setting the parking frame certainty degree to the level 4 is performed in step S226, the processing performed by the parking frame certainty degree set unit 36 proceeds to step S228.

Thus, in the processing of setting the parking frame certainty degree to the level 3, the parking frame certainty degree is set for patterns of FIGS. 4D, 4E, 4J, and 4K, among the parking frames illustrated in FIGS. 4A to 4P. Furthermore, in the processing of setting the parking frame certainty degree to the level 4, the parking frame certainty degree is set for patterns other than the patterns of FIGS. 4D, 4E, 4J, and 4K, among the parking frames illustrated in FIGS. 4A to 4P.

In step S228, processing of determined whether or not a preset termination condition of the processing performed by the parking frame certainty degree set unit 36 is satisfied ("termination condition is satisfied?" in the drawing).

Specifically, the termination condition is determined, for example, depending on whether or not the shift position is at "P" position (parking position) on the basis of the shift position signal received from the shift position sensor 20, or on the basis of the detection of status change of the ignition switch from ON to OFF.

When it is determined that the end points located on the same side do not face each other in the direction of the width WL in step S220 ("No" in the drawing), the processing performed by the parking frame certainty degree set unit 36 proceeds to step S202.

On the other hand, when it is determined that the end points located on the same side face each other in the direction of the width WL in step S220 ("Yes" in the drawing), the processing performed by the parking frame certainty degree set unit 36 proceeds to step S222.

It is to be noted that the above-mentioned processing performed by the parking frame certainty degree set unit 36 is repeated each time a start condition is satisfied.

Figure 18:
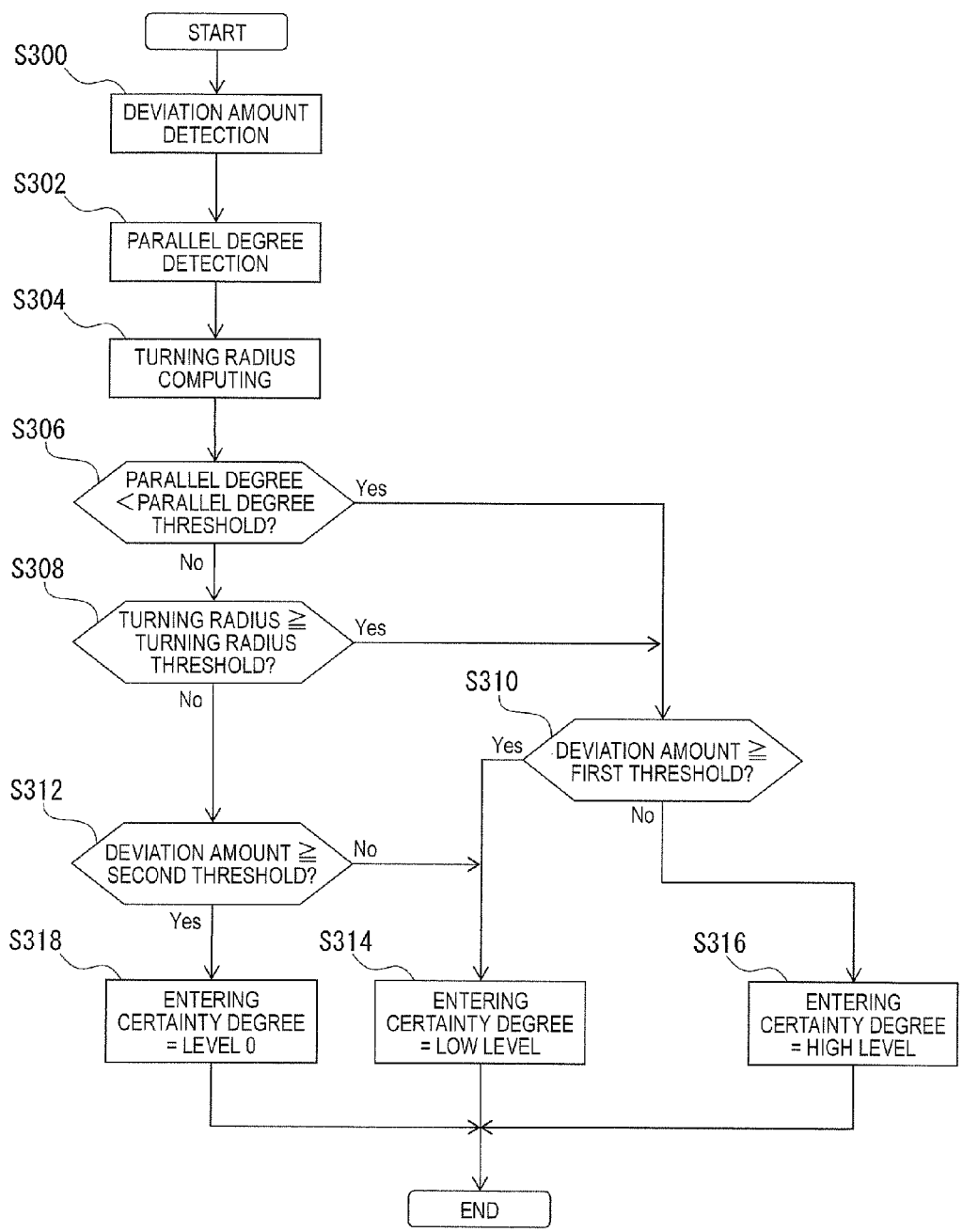
FIG. 18 is a flowchart illustrating processing by a parking frame entering certainty degree set unit of setting a parking frame entering certainty degree.

The processing performed by the parking frame entering certainty degree set unit 38 will be described, by using FIG. 18 and FIG. 19, and referring to FIG. 1 to FIG. 17. FIG. 18 is a flowchart illustrating the processing by the parking frame entering certainty degree set unit 38 of setting the parking frame entering certainty degree. It is to be noted that the parking frame entering certainty degree set unit 38 is configured to perform the processing to be described below at every predefined sampling time (for example, 10 msec).

As illustrated in FIG. 18, when the parking frame entering certainty degree set unit 38 starts the processing (START), firstly, in step S300, processing of detecting a deviation amount between an anticipated track of the vehicle V and the parking frame ("deviation amount detection" in the drawing) is performed. When the processing of detecting the deviation amount between the anticipated trace of the vehicle V and the parking frame is performed in step S300, the processing performed by the parking frame entering certainty degree set unit 38 proceeds to step S302. It is to be noted that in the present embodiment, as an example, a case where centimeter is used as a unit of the deviation amount detected in step S300 will be described. Furthermore, in the present embodiment, a case where the width of the parking frame is set to 2.5 m, as an example, will be described.

Figure 19:
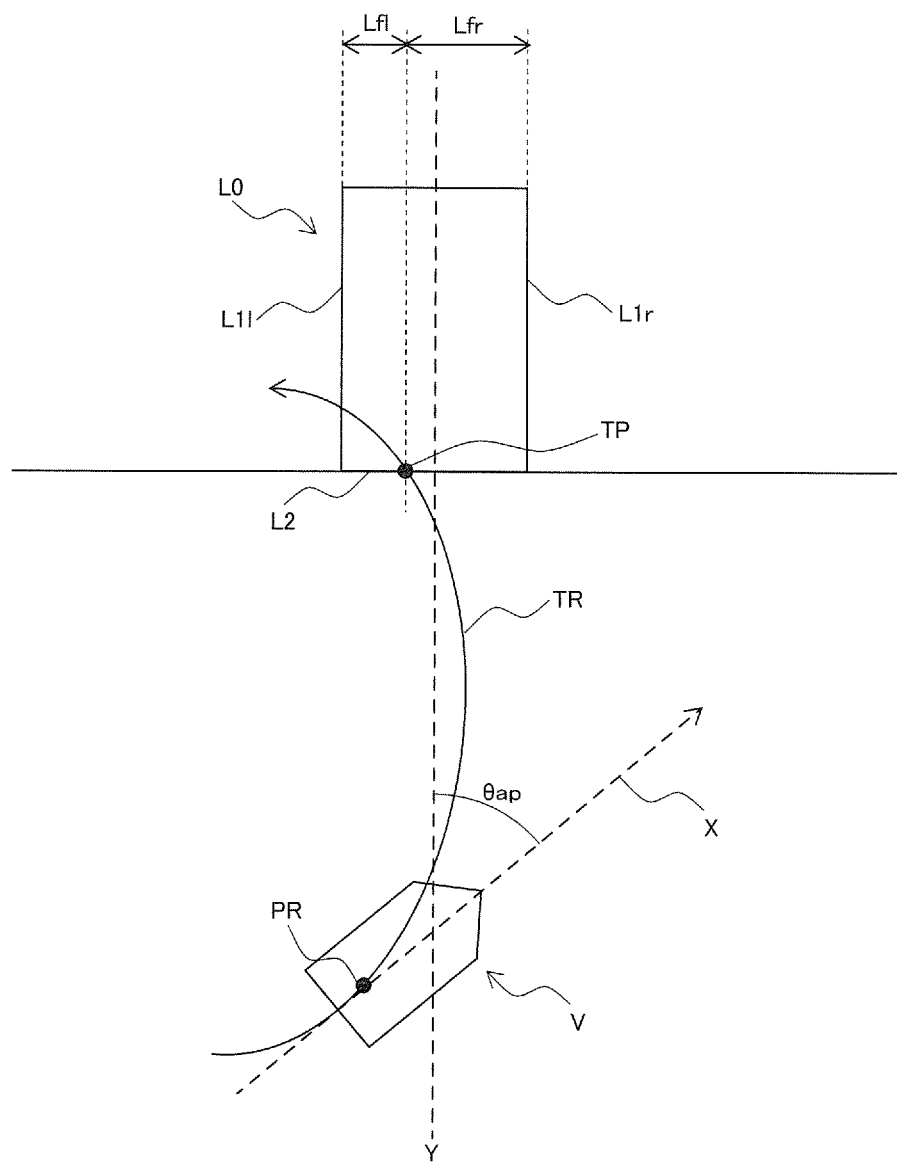
FIG. 19 is a view illustrating processing of detecting a deviation amount between an anticipated track of a vehicle and a parking frame.

Note that, in the processing performed in step S300, for example, a rear wheel anticipated trace TR of the vehicle V is calculated as illustrated in FIG. 19, and a crossing point TP between the rear wheel anticipated trace TR that has been calculated and an entrance L2 of the parking frame L0 is calculated. Furthermore, a distance Lfl between a left side frame line L1*l* of the parking frame L0 and the crossing point TP and a distance Lfr between the right side frame line L1*r* of the parking frame L0 and the crossing point TP are calculated, and then the distance Lfl is compared with the distance Lfr. Then, a longer one of the distance Lfl and the distance Lfr is detected as the deviation amount between the rear wheel anticipated trace TR of the vehicle V and the parking frame L0. It is to be noted that FIG. 19 is a view illustrating the processing of detecting the deviation amount between the rear wheel anticipated track TR of the vehicle V and the parking frame L0.

Furthermore, when the rear wheel anticipated trace TR of the vehicle V is calculated, a center point PR in the vehicle width direction between a right rear wheel WRR and a left rear wheel WRL in the vehicle V is set as a reference point on the vehicle V. Then, by using the images captured by the front camera 14F and the left side camera 14SL in the bird's-eye view images, the vehicle speed of the vehicle V, and the rotation angle (a steering angle) of the steering wheel 28, a virtual moving pathway of the center point PR is computed, and the rear wheel anticipated trace TR is calculated.

In step S302, for example, by using the image captured by the front camera 14F in the bird's-eye view images, processing of detecting a parallel degree of a straight line X and a length direction of the parking frame L0 such as a depth direction is performed ("parallel degree detection" in the drawing). When the processing of detecting the parallel degree of the straight line X and the length direction of the parking frame L0 is performed in step S302, the processing performed by the parking frame entering certainty degree set unit 38 proceeds to step S304. Note that the parallel degree to be detected in step S302, as illustrated in FIG. 19, is detected as an angle θap between the center line Y of the parking frame L0 and the straight line X.

It is to be noted that in step S302, when the vehicle V moves into the parking frame L0 while moving backward, for example, by using the image captured by the rear camera 14R in the bird's-eye view images, the processing of detecting the parallel degree of the straight line X and the length direction of the parking frame L0 is performed. Note that, for example, the moving direction (forward movement or backward movement) of the vehicle V is detected by referring to the current shift position signal.

In step S304, by using the vehicle speed of the vehicle V and the rotation angle (a steering angle) of the steering wheel 28, processing of computing a turning radius of the vehicle V ("turning radius computing" in the drawing) is performed. When the processing of computing the turning radius of the vehicle V is performed in step S304, the processing performed by the parking frame entering certainty degree set unit 38 proceeds to step S306.

In step S306, processing of determining whether or not the parallel degree (θap) detected in step S302 is lower than a predefined parallel degree threshold (for example, 15°) is performed ("parallel degree<parallel degree threshold?" in the drawing).

When it is determined in step S306 that the parallel degree (θap) detected in step S302 is equal to or higher than the parallel degree threshold ("No" in the drawing), the processing performed by the parking frame entering certainty degree set unit 38 proceeds to step S308.

On the other hand, when it is determined in step S306 that the parallel degree (θap) detected in step S302 is lower than the parallel degree threshold ("Yes" in the drawing), the processing performed by the parking frame entering certainty degree set unit 38 proceeds to step S310.

In step S308, processing of determining whether or not the turning radius detected in step S304 is equal to or higher than a predefined turning radius threshold (for example, 100 R) is performed ("turning radius turning radius threshold?" in the drawing).

When it is determined in step S308 that the turning radius detected in step S304 is lower than the turning radius threshold ("No" in the drawing), the processing performed by the parking frame entering certainty degree set unit 38 proceeds to step S312.

On the other hand, when it is determined in step S308 that the turning radius detected in step S304 is equal to or higher than the turning radius threshold ("Yes" in the drawing), the processing performed by the parking frame entering certainty degree set unit 38 proceeds to step S310.

In step S310, processing of determining whether the deviation amount detected in step S300 is equal to or higher than a predefined first threshold (for example, 75 cm) is performed ("deviation amount first threshold?" in the drawing).

When it is determined in step S310 that the deviation amount detected in step S300 is equal to or higher than the first threshold ("Yes" in the drawing), the processing performed by the parking frame entering certainty degree set unit 38 proceeds to step S314.

On the other hand, when it is determined in step S310 that the deviation amount detected in step S300 is lower than the first threshold ("No" in the drawing), the processing performed by the parking frame entering certainty degree set unit 38 proceeds to step S316.

In step S312, processing of determining whether the deviation amount detected in step S300 is equal to or higher than a predefined second threshold (for example, 150 cm) is performed ("deviation amount second threshold?" in the drawing). Note that the second threshold is set to be larger than the first threshold.

When it is determined in step S312 that the deviation amount detected in step S300 is equal to or higher than the second threshold ("Yes" in the drawing) in step S312, the processing performed by the parking frame entering certainty degree set unit 38 proceeds to step S318.

On the other hand, when it is determined in step S312 that the deviation amount detected in step S300 is lower than the second threshold ("No" in the drawing), the processing performed by the parking frame entering certainty degree set unit 38 proceeds to step S314.

In step S314, processing of setting the parking frame entering certainty degree to a low level is performed ("entering certainty degree=low level"). When the processing of setting the parking frame entering certainty degree to the low level is performed in step S314, the processing performed by the parking frame entering certainty degree set unit 38 is terminated (END).

In step S316, processing of setting the parking frame entering certainty degree to a high level is performed ("entering certainty degree=high level"). When the processing of setting the parking frame entering certainty degree to the high level is performed in step S316, the processing performed by the parking frame entering certainty degree set unit 38 is terminated (END).

In step S318, processing of setting the parking frame entering certainty degree to the minimum (level 0) ("entering certainty degree=level 0" in the drawing) is performed. When the processing of setting the parking frame entering certainty degree to the level 0 in step S318, the processing performed by the parking frame entering certainty degree set unit 38 is terminated (END).

As described above, the parking frame entering certainty degree set unit 38 is configured to set the parking frame entering certainty degree to any one level of the "level 0" as the minimum, "low level", which is higher than the level 0, and "high level", which is higher than the low level.

The processing performed by the total certainty degree set unit 40 of setting the total certainty degree will be described, by using FIG. 20, and referring to FIG. 1 to FIG. 19.

The total certainty degree set unit 40 is configured to receive inputs of the parking frame certainty degree signal and the parking frame entering certainty degree signal, and to apply the parking frame certainty degree included in the parking frame certainty degree signal and the parking frame entering certainty degree included in the parking frame entering certainty degree signal on a total certainty degree set map illustrated in FIG. 20. Then, the total certainty degree is set on the basis of the parking frame certainty degree and the parking frame entering certainty degree.

It is to be noted that FIG. 20 is a view illustrating the total certainty degree set map. Furthermore, in FIG. 20, the parking frame certainty degree is indicated as "frame certainty degree" and the parking frame entering certainty degree is indicated as "entering certainty degree". Furthermore, the total certainty degree set map illustrated in FIG. 20 is used while the vehicle V is moving forward.

In an example of the processing by the total certainty degree set unit 40 of setting the total certainty degree, when the parking frame certainty degree is "level 3" and the parking frame entering certainty degree is "high level", the total certainty degree may be set to "high" as illustrated in FIG. 13.

It is to be noted that, in the present embodiment, as an example, a description will be also given of a case where when the total certainty degree set unit 40 preforms the processing of setting the total certainty degree, processing of storing the total certainty degree that has been set in a storage unit is performed, the storage unit from which data is not deleted even if an ignition switch is turned to an OFF state. Note that the storage unit from which the data is not deleted even if the ignition switch is in the OFF state is, for example, a non-volatile memory such as a flash memory or the like.

Thus, in the present embodiment, at the time when the ignition switch is set to the OFF state after parking the vehicle V is completed, and then the ignition switch is turned to an ON state when restarting the vehicle V, the total certainty degree calculated immediately before the time is stored. For this reason, it is possible to start the control from the time when the ignition switch is turned to the ON state when restarting the vehicle V, on the basis of the total certainty degree calculated immediately before the time.

The processing performed by the acceleration suppression control start timing computing unit 42 of computing the acceleration suppression control start timing will be described, by using FIG. 21, and referring to FIG. 1 to FIG. 20.

The acceleration suppression control start timing computing unit 42 is configured to receive an input of the total certainty degree signal, and to apply the total certainty degree included in the total certainty degree signal on an acceleration suppression condition computing map illustrated in FIG. 21. Then, the acceleration suppression control start timing is computed on the basis of the total certainty degree. It is to be noted that FIG. 21 is a view illustrating the acceleration suppression condition computing map.

Furthermore, in a column of the "acceleration suppression condition" in FIG. 21, the acceleration suppression control start timing is indicated by "suppression control start timing (accelerator opening degree)".

In an example of the processing performed by the acceleration suppression control start timing computing unit 42, when the total certainty degree is "high", the acceleration suppression control start timing may be set to a timing when the opening degree of the accelerator pedal 32 increases and reaches "50%", as illustrated in FIG. 21. It is to be noted that the opening degree of the accelerator pedal 32 is set to 100% when the accelerator pedal 32 is pressed (manipulated) to a maximum.

The processing by the acceleration suppression control amount computing unit 44 of calculating the acceleration suppression control amount will be described below, by referring to FIG. 1 to FIG. 21.

The acceleration suppression control amount computing unit 44 is configured to receive an input of the total certainty degree signal, and to apply the total certainty degree included in the total certainty degree signal on the acceleration suppression condition computing map illustrated in FIG. 21. Then, the acceleration suppression control amount is computed on the basis of the total certainty degree. It is to be noted that in a column of the "acceleration suppression condition" in FIG. 21, the acceleration suppression control amount is indicated by "suppression amount".

In an example of the processing performed by the acceleration suppression control amount computing unit 44, when the total certainty degree is "high", the acceleration suppression control amount may be set to a control amount such that the throttle opening degree corresponding to the actual opening degree of the accelerator pedal 32 is suppressed to the "medium" level, as illustrated in FIG. 21. It is to be noted that, in the present embodiment, for an example, the "medium" level of the throttle opening degree is an opening degree suppressed to 25% of the throttle opening degree corresponding to the actual opening degree of the accelerator pedal 32. Similarly, the "small" level of the throttle opening degree is an opening degree suppressed to 50% of the throttle opening degree corresponding to the actual opening degree of the accelerator pedal 32. The "large" level of the throttle opening degree is an opening degree suppressed to 10% of the throttle opening degree corresponding to the actual opening degree of the accelerator pedal 32.

Furthermore, the acceleration suppression control amount computing unit 44 is configured to apply the total certainty degree on the acceleration suppression condition computing map, and to set a presence of absence of the control to output a warning sound. It is to be noted that when outputting the warning sound, for example, the visual information indicating that the acceleration suppression control is operated as character information, symbol, light emission, or the like may be displayed on a display monitor included in the navigation device 26.

(Processing Performed by Acceleration Suppression Command Value Computing Unit 10J)

Figure 22:
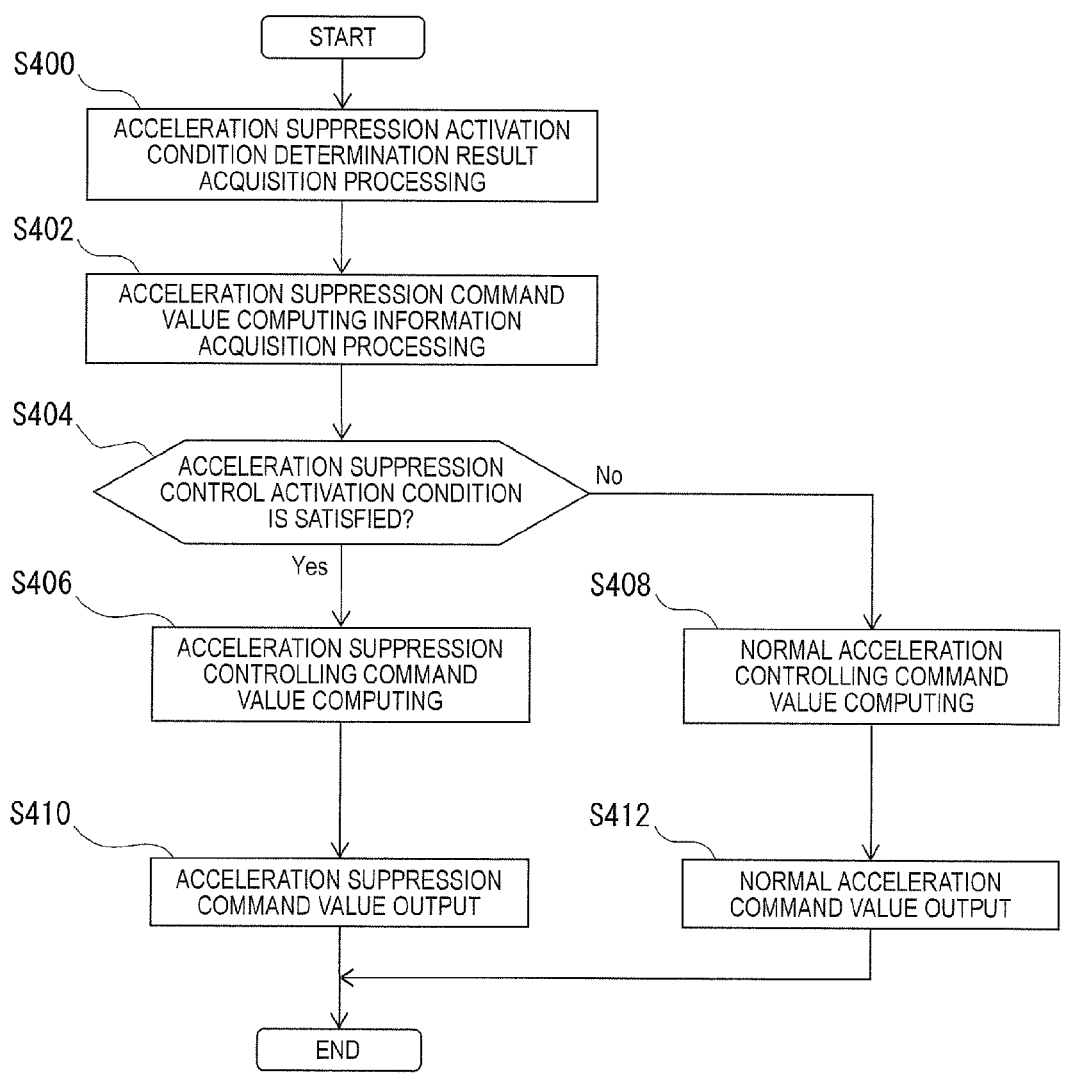
FIG. 22 is a flowchart illustrating processing performed by an acceleration suppression command value computing unit.

Next, the processing performed by the acceleration suppression command value computing unit 10J will be described, by using FIG. 22, and referring to FIG. 1 and FIG. 21. FIG. 22 is a flowchart illustrating the processing performed by the acceleration suppression command value computing unit 10J. It is to be noted that the acceleration suppression command value computing unit 10J is configured to perform the processing to be described below at every predefined sampling time (for example, 10 msec).

As illustrated in FIG. 22, when the acceleration suppression command value computing unit 10J starts the processing (START), firstly, in step S400, the acceleration suppression command value computing unit 10J refers to the acceleration suppression activation condition determination result signal received from the acceleration suppression control computing unit 10I. Then, processing of acquiring the acceleration suppression activation condition determination result ("acceleration suppression activation condition determination result acquisition processing" in the drawing) is performed. When the processing of acquiring the acceleration suppression activation condition determination result in step S400 is performed, the processing performed by the acceleration suppression command value computing unit 10J proceeds to step S402.

In step S402, in addition to the acceleration suppression activation condition determination result acquired in step S400, processing of acquiring information for computing an acceleration suppression command value ("acceleration suppression command value computing information acquisition processing" in the drawing) is performed. When the processing of acquiring the information for computing the acceleration suppression command value is performed in step S402, the processing performed by the acceleration suppression command value computing unit 10J proceeds to step S404.

It is to be noted that the information for computing the acceleration suppression command value is, for example, information included in the acceleration suppression control start timing signal, the acceleration suppression control amount signal, the drive side pressed amount signal, the accelerator manipulation speed signal, that have been described above.

In step S404, processing of determining whether or not the acceleration suppression activation condition determination result acquired in step S400 indicates that the acceleration suppression control operation condition is satisfied is performed ("acceleration suppression control activation condition satisfied?" in the drawing).

When it is determined in step S404 that the determination result indicates the acceleration suppression control operation condition is satisfied ("Yes" in the drawing), the processing performed by the acceleration suppression command value computing unit 10J proceeds to step S406.

On the other hand, when it is determined in step S404 that the determination result indicates the acceleration suppression control operation condition is not satisfied ("No" in the drawing), the processing performed by the acceleration suppression command value computing unit 10J proceeds to step S408.

In step S406, processing of computing the acceleration suppression command value, which is an acceleration command value for performing the acceleration suppression control ("acceleration suppression controlling command value computing" in the drawing), on the basis of the information for computing the acceleration suppression command value acquired in step S402. When the processing of computing the acceleration suppression command value is performed in step S406, the processing performed by the acceleration suppression command value computing unit 10J proceeds to step S410.

Note that, in the processing of computing the acceleration suppression command value, the acceleration suppression command value computing unit 10J refers to the pressed amount of the accelerator pedal 32 included in the drive side pressed amount signal and the acceleration suppression control amount included in the acceleration suppression control amount signal. Then, the acceleration suppression command value computing unit 10J computes the acceleration suppression control amount command value to suppress the throttle opening degree corresponding the actual opening degree of the accelerator pedal 32 in a suppression degree depending on the acceleration suppression control amount (see FIG. 21).

Furthermore, in the processing of computing the acceleration suppression command value, the acceleration suppression command value computing unit 10J refers to the pressed amount of the accelerator pedal 32 included in the drive side pressed amount signal and the acceleration suppression control start timing included in the acceleration suppression control start timing signal. Then, the acceleration suppression command value computing unit 10J computes the acceleration suppression control start timing command value to set the acceleration suppression control start timing to a timing depending on the actual opening degree of the accelerator pedal 32 (see FIG. 21).

Then, in the processing of operating the acceleration suppression command value, the command value including the acceleration suppression control amount command value and the acceleration suppression control start timing command value, that have been computed as described above, is computed as the acceleration suppression command value.

In step S408, processing of computing a normal acceleration command value ("normal acceleration controlling command value computing" in the drawing) is performed. The normal acceleration command value is an acceleration command value to be used in drive force control without the acceleration suppression control, that is, the normal acceleration control. When the processing of computing the normal acceleration command value is performed in step S408, the processing performed by the acceleration suppression command value computing unit 10J proceeds to step S412.

Note that, in the processing of operating the normal acceleration command value, the command value with which the throttle opening degree is computed on the basis of the pressed amount of the accelerator pedal 32 included in the drive side pressed amount signal, is computed as the normal acceleration command value.

In step S410, processing of outputting the acceleration suppression command value signal including the acceleration suppression command value computed in step S406 to the target throttle opening degree computing unit 10K ("acceleration suppression command value output" in the drawing) is performed. When the processing of outputting the acceleration suppression command value signal is performed in step S410, the processing performed by the acceleration suppression command value computing unit 10J is terminated (END).

In step S412, processing of outputting the normal acceleration command value signal including the normal acceleration command value computed in step S408 to the target throttle opening degree computing unit 10K ("normal acceleration command value output" in the drawing) is performed. When the processing of outputting the normal acceleration command value signal is performed in step S412, the processing performed by the acceleration suppression command value computing unit 10J comes to an end (END).

(Processing Performed by Target Throttle Opening Degree Computing Unit 10K)

Figure 23:
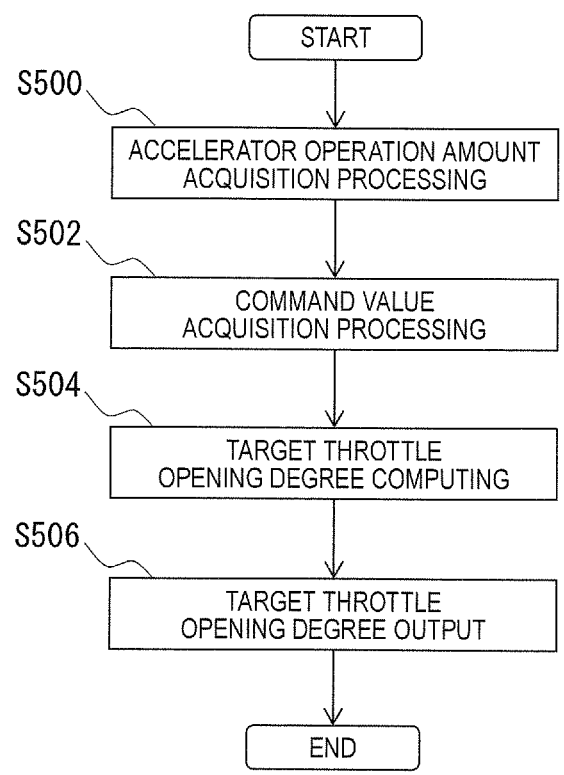
FIG. 23 is a flowchart illustrating processing performed by a target throttle opening degree computing unit.

Next, the processing performed by the target throttle opening degree computing unit 10K will be described, by using FIG. 23, and referring to FIG. 1 to FIG. 22. FIG. 23 is a flowchart illustrating the processing performed by the target throttle opening degree computing unit 10K. It is to be noted that the target throttle opening degree computing unit 10K is configured to perform the processing to be described below at every predefined sampling time (for example, 10 msec).

When the target throttle opening degree computing unit 10K starts (START) the processing as illustrated in FIG. 23, firstly, in step S500, the target throttle opening degree computing unit 10K refers to the drive side pressed amount signal received from the accelerator manipulation amount computing unit 10G. Then, processing of acquiring the pressed amount (acceleration manipulation amount) of the accelerator pedal 32 included in the drive side pressed amount signal ("accelerator operation amount acquisition processing" in the drawing) is performed. When the processing of acquiring the pressed amount (acceleration manipulation amount) of the accelerator pedal 32 is performed in step S500, the processing performed by the target throttle opening degree computing unit 10K proceeds to step S502.

In step S502, on the basis of the information signal received from the acceleration suppression command value computing unit 10J, processing of acquiring the normal acceleration command value (see step S408), or the acceleration suppression command value (see step S406) is performed ("command value acquisition processing" in the drawing). When the processing of acquiring the acceleration suppression command value or the normal acceleration command value is performed in step S502, the processing performed by the target throttle opening degree computing unit 10K proceeds to step S504.

In step S504, on the basis of the pressed amount of the accelerator pedal 32 acquired in step S500 and the command value acquired in step S502, computing of the target throttle opening degree ("target throttle opening degree computing" in the drawing) is performed. When the target throttle opening degree is computed in step S504, the processing performed by the target throttle opening degree computing unit 10K proceeds to step S506.

Note that, in step S504, when the command value acquired in step S502 is the normal acceleration command value (when the acceleration suppression activation condition is not satisfied), the throttle opening degree depending on the pressed amount of the accelerator pedal 32 is computed as the target throttle opening degree.

On the other hand, when the command value acquired in step S502 is the acceleration suppression command value (when the acceleration suppression activation condition is satisfied), the throttle opening degree depending on the acceleration suppression control amount command value is computed as the target throttle opening degree.

The target throttle opening degree is computed by using a following expression (1), for example.

$$\theta^* = \theta 1 - \Delta\theta \quad (1)$$

In the above expression (1), the target throttle opening degree is indicated by "$\theta^*$", the throttle opening degree depending on the pressed amount of the accelerator pedal 32 is indicated by "$\theta 1$", and the acceleration suppression control amount is indicated by "$\Delta\theta$".

In step S506, the target throttle opening degree signal including the target throttle opening degree $\theta^*$ computed in step S504 is output to the engine controller 12 ("target throttle opening degree output" in the drawing). When the processing of outputting the target throttle opening degree signal to the engine controller 12 is performed in step S506, the processing performed by the target throttle opening degree computing unit 10K is terminated (END).

Note that, in step S506, when the command value acquired in step S502 is the suppressed acceleration suppression command value or the acceleration suppression command value, the target throttle opening degree signal is output at a timing when the opening degree (pressed amount) of the accelerator pedal 32 reaches the opening degree corresponding to the acceleration suppression control start timing.

(Operation)

Next, referring to FIG. 1 to FIG. 23, an example of an operation performed by using the vehicular acceleration suppression device 1 according to the present embodiment will be described.

Firstly, an example in which the vehicle V moving in a parking space enters the parking frame L0 selected by the driver will be described. In a state where the vehicle speed of the vehicle V moving in the parking space is equal to or higher than 15 km/h, which is the vehicle speed threshold, an acceleration suppression control activation condition is not satisfied. Thus, the normal acceleration control on which a driver's acceleration intention is reflected is performed without activating the acceleration suppression control in the vehicle V.

When the vehicle speed becomes lower than the vehicle speed threshold, the parking frame L0 is detected, the brake pedal 30 is not manipulated, and the pressed amount of the accelerator pedal 32 is equal to or larger than the threshold accelerator manipulation amount, a determination is made on whether or not the vehicle V enters the parking frame L0.

Furthermore, while the vehicle V is traveling, the parking frame certainty degree set unit 36 sets the parking frame certainty degree, and the parking frame entering certainty degree set unit 38 sets the parking frame entering certainty degree. Then, the total certainty degree set unit 40 sets the total certainty degree on the basis of the parking frame certainty degree and the parking frame entering certainty degree.

Furthermore, while the vehicle V is traveling, on the basis of the total certainty degree set by the total certainty degree set unit 40, the acceleration suppression control start timing computing unit 42 computes the acceleration suppression control start timing and the acceleration suppression control amount computing unit 44 computes the acceleration suppression control amount.

Then, when it is determined that the vehicle V enters the parking frame L0 and it is determined that the acceleration suppression control activation condition is satisfied, the acceleration suppression command value computing unit 10J outputs the acceleration suppression command value signal to the target throttle opening degree computing unit 10K. Furthermore, the target throttle opening degree computing unit 10K outputs the target throttle opening degree signal to the engine controller 12.

Accordingly, when a driver manipulates the accelerator pedal 32 in a state where the acceleration suppression control activation condition is satisfied, the acceleration suppression control amount command value is subtracted from the throttle opening degree corresponding to the pressed amount of the accelerator pedal 32, and the throttle opening degree is set to 50% of the actual throttle opening degree. In this way, the acceleration generated at the vehicle V is reduced and the acceleration of the vehicle V is suppressed. In addition to this, the start timing of reducing the throttle opening degree (suppressing the acceleration) which depends on the pressed amount of the accelerator pedal 32 is set to the timing depending on the acceleration suppression control start timing command value.

Thus, even if the accelerator pedal 32 is manipulated by an erroneous manipulation or the like in a situation where braking is appropriate such as the state where the vehicle V moves to be closer to the position suitable for parking in the parking frame L0, it is possible to suppress the throttle opening degree depending on the total certainty degree. That is, in a state where the total certainty degree is low, the acceleration suppression amount (the suppression degree of the throttle opening degree) is small. Hence, the degradation in the drive performance can be reduced. In a state where the total certainty degree is high, the acceleration suppression amount is large. Hence, the acceleration suppression effect of the vehicle V can be enhanced.

As described above, in the present embodiment, it is possible to suppress the degradation in the drive performance in the parking space before entering the parking frame L0 at the time of parking. In addition, it is possible to suppress acceleration of the vehicle V in the wrong manipulation of the accelerator pedal 32.

Furthermore, in the present embodiment, as the total certainty degree is higher, the acceleration suppression control amount is increased, so that the acceleration of the vehicle V is suppressed and the safety is improved. Furthermore, as the total certainty degree is lower, the acceleration suppression control start timing is delayed, so as to suppress the degradation in the drive performance.

In this way, in a situation to be described below, the improvement in the safety and the suppression of the degradation in the drive performance are enabled.

For example, on a road, in a situation when starting the vehicle V which is waiting near an indication of the parking frame L0 for parallel parking beside the travel road, a certain level of acceleration needs to be permitted.

Furthermore, in the situation to be described below, a certain level of acceleration needs to be permitted. Specifically, other vehicles are existing on both sides (left and right parking frames) of the parking frame L0 where the vehicle V is to be parked, and the vehicle V moves forward to enter some space on the opposite side (apart from each parking frame). Then, the vehicle V moves backward to enter the parking frame L0 where the vehicle V is to be parked, and park the vehicle V there.

In these situations, by controlling the acceleration suppression control start timing and the acceleration suppression control amount on the basis of the total certainty degree, the acceleration of the vehicle V is suppressed to enable an improvement in the safety. In addition to this, the acceleration of the vehicle V is permitted to suppress a degradation in the drive performance.

Next, an example of operation from a situation in which the vehicle V is stopping short of an intersection (a stop line).

Figure 24:
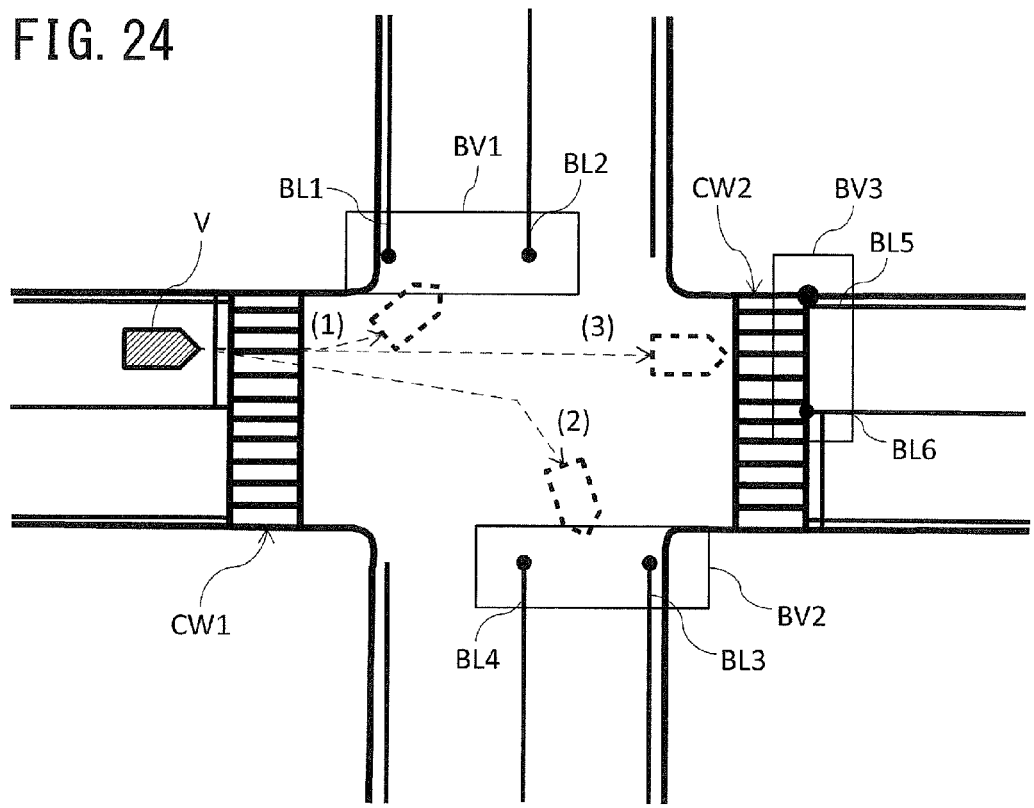
FIG. 24 is a view illustrating an example of an operation in an intersection at a crossroad.

Note that FIG. 24 is a view illustrating the example of the operation in the intersection at a crossroad. When the vehicle V performs turning motion, for example, to turn left at the intersection as indicated by (1) in FIG. 24, the parking frame certainty degree set unit 36 acquires a bird's-eye view image BV1, which includes road marking lines (white lines BL1 and BL2 in the drawing) at a place where the vehicle travels. In this way, the parking frame certainty degree set unit 36 extracts the white lines BL1 and BL2 in the bird's-eye view image BV1 as the parking frame line candidates and pairs them (step S204).

Since the pair of he parking frame line candidates is extracted ("Yes" in step S2000), the parking frame certainty degree set unit 36 sets the search areas on extension lines of the portions of parking frame line candidate corresponding lines corresponding to the parking frame line candidates BL1 and BL2 in the individual image. Then, the parking frame certainty degree set unit 36 searches and extracts the parking frame line candidate corresponding lines within the search areas that have been set on the basis of the second brightness threshold (step S2010). When the parking frame line candidate corresponding lines are extracted, the parking frame certainty degree set unit 36 determines whether or not the lengths of the parking frame line candidate corresponding lines is longer than the parking frame line length threshold Lth1. In the example of (1) in FIG. 24, since the white line on the road is detected as the pair of parking frame line candidates, the lengths of the parking frame line candidates BL1 and BL2 are longer than the parking frame line length threshold Lth1 ("Yes" in step S2020). Thus, the far end portion is not detected in the bird's-eye view image BV1, and the cross line is not detected. Therefore, in this situation, the frame line candidate elimination flag is set to ON for the parking frame line candidates BL1 and BL2 (step S2080). Since the frame line candidate elimination flag is set to ON ("Yes" in step S208), the parking frame certainty degree set unit 36 eliminates the parking frame line candidates BL1 and BL2 from the candidates to be detected as the parking frame (step S210). That is, it is possible to eliminate the parking frame line candidate extracted when the vehicle V turns left at inter section, from the candidates to be detected as the parking frame. Therefore, the parking frame certainty degree is set to level 0, and thus, the acceleration suppression activation condition determination unit 34 determines that there is no parking frame ("No" in step S102). The acceleration suppression activation condition is not satisfied (step S128). In this way, in the scene in which the vehicle turns left at the intersection, the vehicular acceleration suppression device 1 activates the normal acceleration control on which a driver's acceleration intention is reflected, without activating the acceleration suppression control.

Furthermore, also in a case where the vehicle V turns right at the intersection, for example as indicated by (2) in FIG. 24, similarly to the case of turning left, parking frame line candidates BL3 and BL4 are eliminated from the candidates to be detected as the parking frame. The vehicular acceleration suppression device 1 activates the normal acceleration control on which a driver's acceleration intention is reflected, without activating the acceleration suppression control.

Similarly, as indicated by (3) in FIG. 24, also in a case in which the vehicle V travels straight, parking frame line candidates BL5 and BL6 are eliminated from the candidates to be detected as the parking frame. The vehicular acceleration suppression device 1 activates the normal acceleration control on which a driver's acceleration intention is reflected, without activating the acceleration suppression control.

That is, it is determined whether or not the parking frame line candidate extracted from the bird's-eye view image is appropriate for the parking frame line candidate, and the inappropriate candidate is eliminated before using it in the acceleration suppression control. Therefore, it is possible to reduce the degradation in the drive performance due to the acceleration suppression control in a region other than the parking region, such as the intersection.

Figure 25:
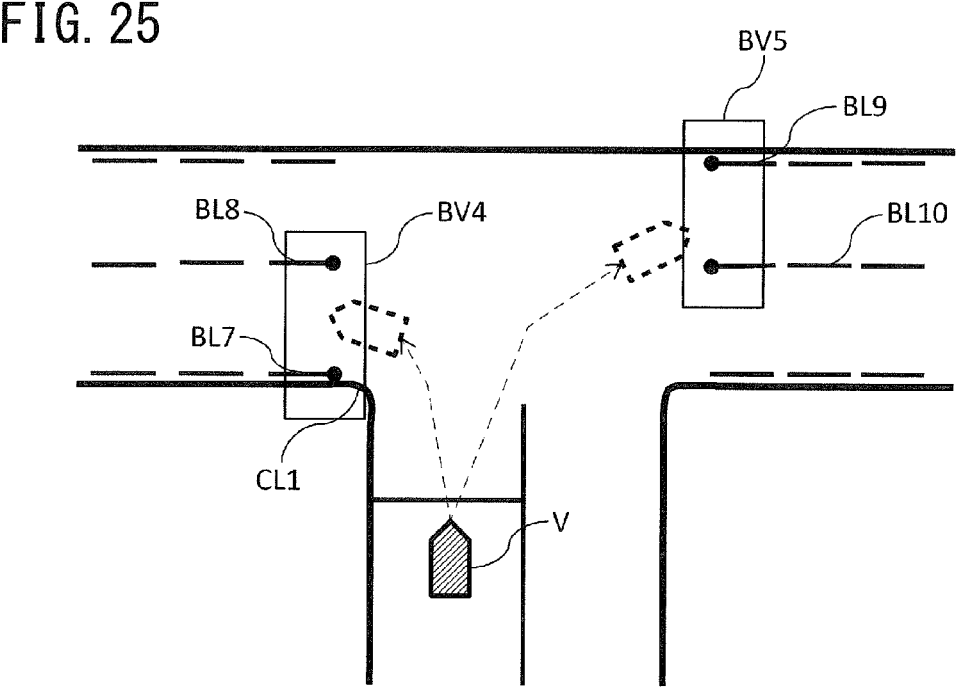
FIG. 25 is a view illustrating an example of an operation in an intersection at a T-junction.

It is to be noted that, FIG. 24 illustrates the example in which the white line on the road continues without being disconnected. However, there is an intersection in which the white line on the road is broken line, as illustrated in FIG. 25. Note that FIG. 25 is a view illustrating an example of an operation in an intersection at a T-junction.

In the example of the intersection at the T-junction illustrated in FIG. 25, when turning left, the parking frame line candidates BL7 and BL8 is extracted from the bird's-eye view image BV4. Therefore, the parking frame certainty degree set unit 36 performs the extraction processing of the parking frame line candidate corresponding lines for a pair of the parking frame line candidates BL7 and BL8. It is assumed that the parking frame line candidates BL7 and BL8 are broken lines equal to or shorter than 5 m, for example. Therefore, the lengths of the parking frame line candidate corresponding lines corresponding to the parking frame line candidates BL7 and BL8 are shorter ("No" in step S2020) than the parking frame line length threshold Lth1 (6.5 m in this example). Furthermore, the parking frame line candidate corresponding lines does not depart from the searching area in mid-course ("No" in step 2090), and thus the frame line candidate elimination flag is set to OFF for the parking frame line candidates BL7 and BL8 (step S2110). Since the frame line candidate elimination flag is set to OFF ("NO" in step S208), the parking frame certainty degree set unit 36 leaves the parking frame line candidates BL7 and BL8 as the candidate to be detected as the parking frame. Then, when the parking frame line candidates BL7 and BL8 satisfy the parking frame condition ("Yes" in step S212), the parking frame certainty degree is set to level 1 (step S214). In this case, although the parking frame entering certainty degree satisfies the activation condition of the acceleration suppression control, the acceleration suppression control is not activated when the vehicle V travels at a speed equal to or higher than the threshold vehicle speed 15 km/h.

On the other hand, when the parking frame line candidates BL7 and BL8 do not satisfy the parking frame condition ("No" in step S212), the frame certainty degree remains at level 0. In this case, the vehicular acceleration suppression device 1 activates the normal acceleration control on which a driver's acceleration intention is reflected, without activating the acceleration suppression control.

Figures 26, 27:
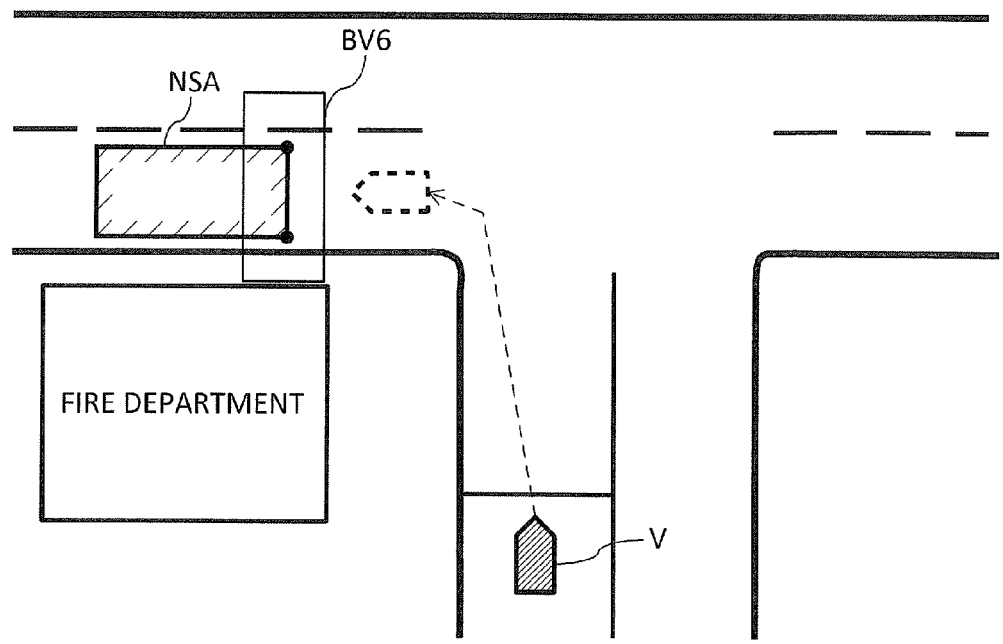
FIG. 26 is a view illustrating an example of a operation in a case where there is a road marking indicative of a no-stopping region ahead of an intersection passed after turning left.
FIG. 27 is a view illustrating a modification.

Furthermore, FIG. 26 is a view illustrating an example of a operation in a case where there is a road marking indicative of a no-stopping region ahead of an intersection passed after turning left.

In the example illustrated in FIG. 26, there is a fire department immediately ahead of the vehicle after turning left. Therefore, there is the road marking indicative of the no-stopping region NSA on the road in front of the fire department. The no-stopping region NSA could be erroneously detected as the parking frame line candidate, since its shape is similar to the parking frame.

In the present embodiment, when the length of frame line of the no-stopping region NSA in the longitudinal direction is longer than the parking frame line length threshold Lth1 (6.5 m, for example), it is possible to eliminate the pair of the parking frame line candidates extracted from the no-stopping region NSA included in the bird's-eye view image from the candidates to be detected as the parking frame line. Therefore, even when the no-stopping region NSA having a frame line length longer than the parking frame line length threshold Lth1 is erroneously detected as the parking frame line candidate, it is possible to prevent the acceleration suppression control from being activated. Therefore, it is possible to prevent the degradation in the drive performance due to the acceleration suppression control.

It is to be noted that the acceleration suppression control has been described by giving as an example of a control of reducing the acceleration command value for accelerating the vehicle V, however, the present disclosure is not limited to this configuration. The acceleration suppression control may include a control to make the vehicle V travel at a low vehicle speed equal to or lower than a predefined vehicle speed, for example. The acceleration suppression control is not limited to only a drive force control and may include a control to decelerate (including stop) the vehicle V by a brake device or the like. Furthermore, the acceleration suppression control may include a transmission control of a power by a connection control of a clutch (for example, the clutch is disconnected when suppressing so as not to transmit the power), or the like.

Note that the accelerator manipulation detection sensor 24 and the accelerator manipulation amount computing unit 10G described above correspond to an acceleration manipulation amount detection unit.

Furthermore, the acceleration suppression command value computing unit 10J and the target throttle opening degree computing unit 10K described above correspond to an acceleration control unit. Furthermore, the surrounding environment recognition sensor 14 described above corresponds to an imaging unit and a bird's-eye view image acquisition unit. Furthermore, the parking frame line candidate extraction processing (step S204) performed by the parking frame certainty degree set unit 36 described above corresponds to a parking frame line candidate extraction unit.

Furthermore, the processing (steps S212 to S226) performed by the parking frame certainty degree set unit 36 of detecting the parking frame to set the frame certainty degree corresponds to a parking frame detection unit. Furthermore, the acceleration suppression control start timing computing unit 42, the acceleration suppression control amount computing unit 44, the acceleration suppression command value computing unit 10J, and the target throttle opening degree computing unit 10K correspond to an acceleration suppression control unit.

Furthermore, the parking frame line candidate corresponding line extraction processing (step S2010) performed by the parking frame certainty degree set unit 36 described above corresponds to a parking frame line candidate corresponding line extraction unit. Furthermore, the processing of setting the frame line candidate elimination flag (steps S2020 to S2110) and the processing of eliminating the parking frame line candidate on the basis of the frame line candidate elimination flag (steps S208 to S210) performed by the parking frame certainty degree set unit 36 described above corresponds to a frame line candidate elimination unit.

Furthermore, the detection processing performed by the parking frame certainty degree set unit 36 of detecting the turning motion of the vehicle V on the basis of the information for computing the turning angle, such as the steering angle corresponds to a turning motion detection unit.

Furthermore, a travel road determination processing (step S2030) performed by the parking frame certainty degree set unit 36 described above corresponding to a travel region determination unit.

Effects of Embodiment

According to the present embodiment, following effects to be described below will be brought out.

(1) The accelerator manipulation detection sensor 24 and the accelerator manipulation amount computing unit 10G detect the manipulation amount (acceleration manipulation amount) of the accelerator pedal 32. The acceleration suppression command value computing unit 10J and the target throttle opening degree computing unit 10K control the acceleration to be generated at the vehicle V depending on the acceleration manipulation amount detected by the accelerator manipulation detection sensor 24 and the accelerator manipulation amount computing unit 10G. The accelerator manipulation detection sensor 14 captures the image of the region including the road surface around the vehicle and to acquire the bird's-eye view image by performing the bird's-eye view conversion on the captured image. The parking frame certainty degree set unit 36 extracts the line located on the road surface from the bird's-eye view image as a candidate of the parking frame line, and to detect the parking frame from the parking frame candidate that has been extracted. The acceleration suppression control start timing computing unit 42, the acceleration suppression control amount computing unit 44, the acceleration suppression command value computing unit 10J, and the target throttle opening degree computing unit 10K perform the acceleration suppression control which reduces the acceleration (the throttle opening degree) to be generated at the vehicle V, which depends on the acceleration manipulation amount, on the basis of the parking frame extracted by the parking frame certainty degree set unit 36. The acceleration to be generated at the vehicle V is controlled by the acceleration suppression command value computing unit 10J and the target throttle opening degree computing unit 10K. The parking frame certainty degree set unit 36 extracts, from the captured image of the front of the vehicle V (the individual image SPF) acquired by the surrounding environment recognition sensor 14, the parking frame line candidate corresponding line corresponding to the parking frame line candidate extracted from the bird's-eye view image. When it is determined that the length of the parking frame line candidate corresponding line is longer than the predefined parking frame line length threshold Lth1, the parking frame certainty degree set unit 36 eliminates the parking frame line candidate corresponding to the parking frame line candidate corresponding line from the candidates to be detected as the parking frame. That is, when the parking frame line candidate is extracted from the bird's-eye view image of the front of the vehicle V, the parking frame line candidate corresponding line corresponding to the parking frame line candidate is extracted from the captured image (the individual image SPF) corresponding to the bird's-eye view image. It is determined whether or not the length of the parking frame line candidate corresponding line that has been extracted is longer the parking frame line length threshold. Then, when it is determined that the length of the parking frame line candidate corresponding line that has been extracted is longer than the parking frame line length threshold, the parking frame line candidate corresponding to the parking frame line candidate corresponding line is eliminated from the candidates to be detected as the parking frame. Accordingly, it is possible to eliminate a line having an inappropriate length for the parking frame line candidate (for example, a length of the road marking lines or the like on the public road) from the candidates to be detected as the parking frame. Thus, it is possible to prevent or reduce the occurrence of the acceleration suppression processing in a region other than a parking region, such as the intersection. Therefore, it is possible to prevent or reduce the degradation in the drive performance due to the acceleration suppression control in the region other than the parking region.

(2) The parking frame certainty degree set unit 36 detects the line in the captured image corresponding to the parking frame line candidate as the portion of the parking frame line candidate corresponding line, and extracts the remaining portion of the parking frame line candidate corresponding line from the search area predefined as an image region which extends from the far end portion of the portion of the parking frame line candidate corresponding line in the perspective direction and having a width equal to or larger than the width of the portion of the parking frame line candidate corresponding line. Since the searching area has a width, it is possible to extract a line which curves in mid-course. Thus it is possible to improve the accuracy in extracting the parking frame line candidate corresponding line.

(3) When it is determined that the extension line of the portion of the parking frame line candidate corresponding line departs from the search area at a partway in a course, the parking frame certainty degree set unit 36 eliminates the parking frame line candidate in the bird's-eye view image corresponding to the portion of the parking frame line candidate corresponding line from the candidates to be detected as the parking frame. Note that the situation in which the line departs from the search area in mid-course is likely to be caused due to the behavior of the vehicle V such as pitching or the like. Thus, the parking frame line candidate corresponding line is more likely to extend further. Therefore, in such a situation, the parking frame line candidate corresponding to the parking frame line candidate corresponding line is eliminated from the candidates to be detected as the parking frame. Therefore, it is possible to prevent or reduce the degradation in the drive performance due to the acceleration suppression control in the region other than the parking region, in the situation in which the vehicle behavior such as pitching or the like is caused.

(4) The parking frame certainty degree set unit 36 detects the end portion on the farther side from the vehicle V of the parking frame line candidate extracted by the parking frame line candidate extraction unit from the bird's-eye view image. Furthermore, when it is determined that the length of the parking frame line candidate corresponding line is longer than the parking frame line length threshold Lth, and that the end portion on the farther side of the parking frame line candidate corresponding to the parking frame line candidate corresponding line is detected in the bird's-eye view image, the parking frame line candidate remains as the candidate to be detected as the parking line. Note that the reliability of the extraction result of the parking frame line candidate corresponding line extracted from a relatively near image region is higher than the reliability of the extraction result of the parking frame line candidate corresponding line extracted from a relatively far image region. Thus, although it is determined that the parking frame line candidate corresponding line is longer than the parking frame line length threshold Lth1, when the end portion on farther side of the parking frame line candidate which is likely the parking frame is extracted from the bird's-eye view image, the parking frame line candidate remains without being eliminated from the candidates to be detected as the parking line. Therefore, it is possible to prevent or reduce the degradation in the drive performance due to the acceleration suppression control in the region other than the parking region, and to prevent or reduce the occurrence of the situation in which the acceleration suppression control is not performed in the parking region.

(5) The parking frame certainty degree set unit 36 detects the cross line CL crossing the parking frame line candidate corresponding line at an angle equal to or smaller than the predefined crossing angle threshold, from the captured image. Then, when it is determined the length of the parking frame line candidate corresponding line is longer than the parking frame line length threshold Lth1, and when it is determined that that the cross line CL which crosses the parking frame line candidate corresponding line at a length position equal to or shorter than the parking frame line length threshold Lth1 is detected, and that the cross line has a length equal to or longer than the predefined cross line length threshold Lth2, the parking frame line candidate corresponding to the parking frame line candidate corresponding line is left as the candidate to be detected as the parking line. Although the parking frame line candidate corresponding line is longer than the parking frame line length threshold Lth1, when the cross line CL crosses the parking frame line candidate corresponding line at the angle equal to or smaller than the crossing angle threshold and at the length position equal to or shorter than the parking frame line length threshold Lth1, there may be a parking space having a letter H shape in which two parking frames is continuously arranged in the longitudinal direction. Therefore, when such a cross line CL is detected, the parking frame line candidate corresponding to the parking frame line candidate corresponding line remains without being eliminated from the candidates to be detected as the parking line. Accordingly it is possible to prevent or reduce the degradation in the drive performance due to the acceleration suppression control in the region other than the parking region, and to prevent or reduce the occurrence of the situation in which the acceleration suppression control is not performed in the parking region having plural parking frames continuously arranged in the longitudinal direction.

(6) The parking frame certainty degree set unit 36 detects the edge pixel having a brightness equal to or larger than the first brightness threshold which is a predefined threshold of brightness, in the bird's-eye view image, to extract the parking frame line candidate on the basis of the edge pixel. Furthermore, The parking frame certainty degree set unit 36 detects the edge pixel having a brightness equal to or larger than the second brightness threshold which is a predefined threshold of brightness smaller than the first brightness threshold, in the captured image, to extract the parking frame line candidate corresponding line on the basis of the edge pixel. It is necessary to extract a portion of a line farther than the parking frame line candidate from the captured image, as the parking frame line candidate corresponding line. Therefore, when the brightness threshold is too high, the accuracy in extraction decreases and there is a possibility that the actual line cannot be extracted. Therefore, by setting the brightness threshold to be smaller than when extracting the parking frame line candidate, it is possible to improve the accuracy in extracting the parking frame line candidate corresponding line.

(7) The parking frame certainty degree set unit 36 performs the processing of eliminating the parking frame line candidate from the candidates to be detected as the parking frame, only for the pair of two parking frame line candidates adjoining each other in the bird's-eye view image, out of the parking frame line candidates extracted from the bird's-eye view image. That is, since the parking frame is formed of at least a pair of two lines adjoining each other, it is determined whether or not the condition of the candidate to be detected as the paring frame is satisfied only for the pair of two lines adjoining each other extracted from the bird's-eye view image. Therefore, it is possible to more surely eliminate something which is not likely the parking frame, from the candidates to be detected.

(8) The parking frame certainty degree set unit 36 detects the turning motion of the vehicle V on the basis of information for computing the turning angle, such as the steering angle. Furthermore, when it is determined that the vehicle performs a turning motion satisfying the predefined turning condition, the parking frame certainty degree set unit 36 performs the processing of eliminating the parking frame line candidate from the candidates to be detected as the parking frame. Note that, when the vehicle speed becomes equal to or lower then 15 km/h, for example, in the turning motion at the intersection, especially in turning right or left, the road marking on the public road (for example, white line) is likely to be erroneously detected as the parking frame. In addition to this, there are many road markings ahead of the vehicle after turning right or left, which are likely to be erroneously detected as the parking frame line candidate. Therefore, in the situation after the vehicle turns right or left at the intersection, the acceleration suppression control due to the erroneous detection of the parking frame is likely to be caused. That is, by performing the processing of eliminating the parking frame line candidate from the candidates to be detected as the parking frame in only such a situation, it is possible to reduce the erroneous elimination of the parking frame line candidate and to perform the processing at a more effective timing.

(Modification)

(1) In the present embodiment, it is determined whether or not the parking frame line candidate is to be eliminated, depending on whether or not the length of the parking frame line candidate corresponding line extracted from the individual image SPF is longer than the parking frame line length threshold Lth1, and on whether or not there is the end portion on farther side of the parking frame line candidate in the front side bird's-eye view image BVPF. In addition to this, it is determined whether or not there is the cross line CL crossing the parking frame line candidate corresponding line extracted from the individual image SPF in a manner satisfying the predefined crossing condition, and whether or not there is a line departing from the search area in mid-course. Then, it is determined on the basis of these determination results, whether or not the parking frame line candidate that has been extracted is the elimination target. However, the present disclosure is not limited to this configuration. For example, the brightness of the surroundings may be detected with an optical sensor or the like, when detecting a situation in which it is difficult to see a far road marking, such as night-time or the like, a visible line (an extractable parking frame line candidate) may be eliminated from the candidates to be detected as the parking frame. Such a method may be performed instead of the method according to the present embodiment or in addition to this. It is to be noted that another method may be used instead or additionally to detect the situation in which it is difficult to see the road marking. For example, such a situation may be detected by depending on the driving status of a wiper or lighting of a fog lamp.

(2) In the present embodiment, the parking frame line candidate corresponding line is extracted from the individual image (captured image). However, the present disclosure is not limited to this configuration. The parking frame line candidate corresponding line may be extracted from an image obtained by processing the captured image. For example, a bird's-eye view image with a wider area than that of the bird's-eye view image for display may be generated beforehand, and the parking frame line candidate corresponding line may be extracted from the wider bird's-eye view image.

(3) In the present embodiment, it is determined whether or not the cross line which crosses the parking frame line candidate corresponding line at an angle equal to or smaller than the predefined crossing angle threshold and at a length position equal to or shorter than the parking frame line length threshold Lth1, and has a length equal to or longer than the predefined cross line length threshold Lth2 is detected. Then, when such a cross line is detected, the parking frame line candidate corresponding to the parking frame line candidate corresponding line is left as the candidate to be detected. However, the present disclosure is not limited to this configuration. For example, the crossing point may be a length position (for example, 6 m) shorter than the parking frame line length threshold Lth1 (for example, 6.5 m). Furthermore, in not only the case where there is the cross line on the extension of the parking frame line candidate corresponding line, but also a case where there is a cross line on the right side or the left side thereof, the parking frame line candidate corresponding to the parking frame line candidate corresponding line may remain as the candidate to be detected.

(4) In the present embodiment, the acceleration suppression control start timing and the acceleration suppression control amount are computed on the basis of the total certainty degree set by the total certainty degree set unit 40. However, the present disclosure is not limited to this. That is, the acceleration suppression control start timing and the acceleration suppression control amount may be computed on the basis of the parking frame certainty degree set by the parking frame certainty degree set unit 36. In this case, the acceleration suppression control start timing and the acceleration suppression control amount may be computed by applying the parking frame certainty degree, for example, on the acceleration suppression condition computing map illustrated in FIG. 27. It is to be noted that FIG. 27 is a view illustrating the modification.

(5) In the present embodiment, the parking frame certainty degree set unit 36 is configured to set the parking frame certainty degree on the basis of the bird's-eye view image (environment) of surroundings of the vehicle V and the vehicle speed (travel state) of the vehicle V. However, the configuration of the parking frame certainty degree set unit 36 is not limited to this. That is, the parking frame certainty degree set unit 36 may be configured to set the parking frame certainty degree by using not only the bird's-eye view image of surroundings of the vehicle V and the vehicle speed, but also a current position of the vehicle V included in the vehicle position signal and the type of road (road type) on which the vehicle V travels included in the travel road information signal. In this case, for example, when it is detected that the current position of the vehicle V is on a public road on the basis of the information included in the vehicle position signal and the travel road information signal, it is determined that there is no parking frame L0 around the vehicle V, and the parking frame certainty degree is set to "level 0". In this way, for example, when the vehicle V moves into the parking frame in which the operation of the acceleration suppression control is not desirable, such as a parking frame arranged at a roadside of a public road, or the like, it is possible to suppress the degradation in the drive performance of the vehicle V.

(6) In the present embodiment, when determining that the end points of the lines La and Lb face each other in the width WL direction, the parking frame certainty degree set unit 36 sets the parking frame certainty degree to the level 3 or the level 4 (see step S230). However, the processing of set the parking frame certainty degree to the level 3 or level 4 is not limited to this. That is, the end point of the line L has a shape not to be indicated on a public road, for example, such as a letter U shape (see FIGS. 4G to 4K, 4M, and 4N), the parking frame certainty degree may be set to the level 3 or the level 4.

(7) In the present embodiment, the parking frame certainty degree set unit 36 is configured to set the parking frame certainty degree on the basis of the bird's-eye view image (environment) of surroundings of the vehicle V and the vehicle speed (travel state) of the vehicle V. However, the parking frame certainty degree set unit 36 is not limited to this. That is, when the vehicle V is configured to include the device (parking support device) for supporting a driver operating the steering operation to the parking frame L0, and the parking support device is in the ON state, the level of the parking frame certainty degree may be easily increased. Note that the configuration in which the level of the parking frame certainty degree is easily increased is, for example, a configuration in which the above-mentioned predefined travel distance is set to be shorter than usual.

(8) In the present embodiment, the acceleration suppression control amount and the acceleration suppression control start timing are changed on the basis of the total certainty degree so as to change the suppression degree of the acceleration command value. However, the present disclosure is not limited to this. That is, depending on the total certainty degree, only the acceleration suppression control start timing or only the acceleration suppression control amount may be changed so as to change the suppression degree of the acceleration command value. In this case, for example, as the total certainty degree is higher, the acceleration suppression control amount may be set to be higher, so that the suppression degree of the acceleration command value is increased without changing the acceleration suppression control start timing.

(9) In the present embodiment, the acceleration command value is controlled to suppress the acceleration of the vehicle V which depends on the pressed amount (acceleration manipulation amount) of the accelerator pedal 32.

However, the present embodiment is not limited to this. That is, for example, the throttle opening degree depending on the pressed amount (acceleration manipulation amount) of the accelerator pedal 32 may be set to a target throttle opening degree, and in addition, a brake force may be generated by the above-described brake device so that the acceleration of the vehicle V depending on the acceleration manipulation amount may be suppressed.

(10) In the present embodiment, the parking frame certainty degree is calculated as the level 0 that is a minimum value and several stages of level (levels 1 to 4) higher than the minimum value. However, the stages of the parking frame certainty degree are not limited to them. That is, the parking frame certainty degree may be calculated as only two stages, including a level (for example, "level 0") that is the minimum value and the other level (for example, "level 100") that is higher than the minimum value.

(11) In the present embodiment, the parking frame entering certainty degree is calculated as the "level 0" that is the minimum value, the "low level" that is higher than the level 0, or the "high level" that is higher than the low level. However, the stages of the parking frame entering certainty degree are not limited to this. That is, the parking frame entering certainty degree, may be calculated as only two stages including a level (for example, "level 0") that is the minimum value and the other level (for example, "level 100") that is higher than the minimum value.

(12) In the present embodiment, the total certainty degree is calculated as any one of four stages of level ("extremely low", "low", "high", and "extremely high") depending on the parking frame certainty degree that has been calculated as any one of five stages of level and the parking frame entering certainty degree that has been calculated as any one of three stages of level. However, the stages of the total certainty degree are not limited to this. That is, the total certainty degree may be calculated as only two stages of level including a level (for example, "level 0") that is the minimum value and the other level (for example, "level 100") that is higher than the minimum value. In this case, when the parking frame certainty degree and the parking frame entering certainty degree are calculated as the level that is the minimum value, for example, the total certainty degree is calculated as the level that is the minimum value. Furthermore, for example, when the parking frame certainty degree and the parking frame entering certainty degree are calculated as the level that is higher than the minimum value, the total certainty degree may be calculated as the level that is higher than the minimum value.

Furthermore, the present embodiment is a preferred specific example of the present disclosure and given various limitations which are technically preferable. However, the scope of the present disclosure is not limited to these aspects unless there is a particular description to limit the present disclosure in the foregoing description. Furthermore, the drawings used in the foregoing description are exemplary figures in which vertical and horizontal scales of members and portions are different from actual members or portions for the sake of illustration. Furthermore, the present disclosure is not limited to the above-described embodiment, and modifications, improvements, equivalents, and so on within a range that can accomplish the object of the present invention are included in the present disclosure.

While a limited number of embodiments have been described with illustration herein, it should be apparent that the present disclosure is not limited to them and modifications and adaptations to each of the embodiments on the basis of the above disclosure may occur to one skilled in the art.

The invention claimed is:

1. A vehicular acceleration suppression device, comprising:
a camera configured to capture an image of a region including a road surface around a vehicle; and
a controller configured to:
detect an acceleration manipulation amount of an acceleration manipulation element manipulated by a driver to instruct acceleration,
control the acceleration to be generated at the vehicle depending on the detected acceleration manipulation amount,
cut off a partial image from an image captured from the camera,
create a bird's-eye view image based on the partial image,
extract a line located on the road surface from the bird's-eye view image as a parking frame line candidate,
detect a parking frame from the parking frame line candidate,
perform an acceleration suppression control which reduces the controlled acceleration based on the detected parking frame,
extract a parking frame line candidate corresponding line corresponding to the extracted parking frame line candidate from the captured image of the front of the vehicle captured by the camera, and
eliminate the parking frame line candidate corresponding to the parking frame line candidate corresponding line from candidates to be detected as the parking frame, when it is determined that a length of the parking frame line candidate corresponding line is longer than a predefined parking frame line length threshold,
wherein a segment of the parking frame line candidate corresponding line does not appear in the bird's-eye view image is extracted from a portion of the captured image of the front of the vehicle, the portion being other than the partial image converted into the bird's-eye view image.

2. The vehicular acceleration suppression device according to claim 1, wherein the controller is configured to
detect a line in the captured image corresponding to the parking frame line candidate as a portion of the parking frame line candidate corresponding line, and
extract a remaining portion of the parking frame line candidate corresponding line from a search area predefined as an image region which extends from a far end of the portion of the parking frame line candidate corresponding line toward the vehicle and having a width equal to or larger than a width of the portion of the parking frame line candidate corresponding line.

3. The vehicular acceleration suppression device according to claim 2, wherein the controller is configured to eliminate the parking frame line candidate in the bird's-eye view image corresponding to the portion of the parking frame line candidate corresponding line from the candidates to be detected as the parking frame, when it is determined that that an extension line of the portion of the parking frame line candidate corresponding line departs from the search area in between end portions of the search area.

4. The vehicular acceleration suppression device according to claim 1, wherein the controller is further configured to:
  detect an end portion on a farther end of the extracted parking frame line candidate from the vehicle from the bird's-eye view image, and
  when the controller determines that the length of the parking frame line candidate corresponding line is longer than the parking frame line length threshold and the controller detects the end portion on the farther end of the parking frame line candidate corresponding to the parking frame line candidate corresponding line in the bird's-eye view image, the controller keeps the parking frame line candidate as the candidate to be detected as the parking line.

5. The vehicular acceleration suppression device according to claim 1, wherein the controller is further configured to detect a cross line crossing the parking frame line candidate corresponding line at an angle equal to or smaller than a predefined crossing angle threshold, and wherein
  when it is determined that the length of the parking frame line candidate corresponding line is longer than the parking frame line length threshold, and when it is determined based on a detection result by the controller, that the cross line which crosses the parking frame line candidate corresponding line at a length position equal to or shorter than the parking frame line length threshold is detected, and that the cross line has a length equal to or longer than a predefined cross line length threshold is detected, the controller keeps the parking frame line candidate corresponding to the parking frame line candidate corresponding line as the candidate to be detected as the parking line.

6. The vehicular acceleration suppression device according to claim 1, wherein
  the controller is configured to:
    detect a first edge pixel having a brightness equal to or larger than a first brightness threshold which is a predefined threshold of brightness, in the bird's-eye view image, to extract the parking frame line candidate based on the first edge pixel, and
    detect a second edge pixels having a brightness equal to or larger than a second brightness threshold which is a predefined threshold of brightness smaller than the first brightness threshold, in the captured image, to extract the parking frame line candidate corresponding line based on the second edge pixel.

7. The vehicular acceleration suppression device according to claim 1, wherein the controller is configured to eliminate the parking frame line candidate to be detected as the parking frame, from the candidates parking frame lines, only when a pair of two lines adjoining each other in the bird's-eye view image are detected.

8. The vehicular acceleration suppression device according to claim 1, further comprising:
  a steering angle sensor configured to detect a steering manipulation amount of a steering manipulation element manipulated by the driver to steer wherein the controller is configured to:
    detect a turning motion of the vehicle based on the steering manipulation amount and
    eliminate the parking frame line candidate from the candidates to be detected as the parking frame, when the controller determines, based on the turning motion, that the vehicle performs the turning motion satisfying a predefined turning condition.

* * * * *